United States Patent
Bittar et al.

(10) Patent No.: US 8,860,416 B2
(45) Date of Patent: Oct. 14, 2014

(54) DOWNHOLE SENSING IN BOREHOLE ENVIRONMENTS

(75) Inventors: Michael S. Bittar, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 389 days.

(21) Appl. No.: 13/201,031

(22) PCT Filed: Jun. 1, 2010

(86) PCT No.: PCT/US2010/036851
§ 371 (c)(1),
(2), (4) Date: Aug. 11, 2011

(87) PCT Pub. No.: WO2011/043851
PCT Pub. Date: Apr. 14, 2011

(65) Prior Publication Data
US 2011/0298461 A1 Dec. 8, 2011

(30) Foreign Application Priority Data
Oct. 5, 2009 (WO) ...................... PCT/US09/59534

(51) Int. Cl.
*G01V 3/08* (2006.01)
*G01V 3/28* (2006.01)

(52) U.S. Cl.
CPC ...................... *G01V 3/28* (2013.01)
USPC ........................................................ 324/338

(58) Field of Classification Search
CPC ...................................................... G01V 3/28
USPC ................................. 324/338–339
See application file for complete search history.

(56) References Cited

U.S. PATENT DOCUMENTS

| | | |
|---|---|---|
| 2,921,253 A | 1/1956 | Liben |
| 3,479,001 A | 11/1969 | Dower |

(Continued)

FOREIGN PATENT DOCUMENTS

| | | |
|---|---|---|
| WO | 2010005902 A2 | 1/2010 |
| WO | 2011044069 A1 | 4/2011 |

OTHER PUBLICATIONS

International Search Report with Written Opinion issued Nov. 25, 2009 for International Patent Application No. PCT/US09/059545, 8 pages.

(Continued)

*Primary Examiner* — Jay Patidar
(74) *Attorney, Agent, or Firm* — Smith IP Services, P.C.

(57) ABSTRACT

A drill string can include at least one transmit antenna and at least one receive antenna. The transmit antenna transmits at least one electromagnetic signal into a region of an earth formation. The receive antenna receives the signal from the region of the earth formation. The transmit antenna comprises one of a magnetic dipole and an electric dipole, and the receive antenna comprises the other of the magnetic dipole and the electric dipole. At least one characteristic of the region of the earth formation is determined, based at least partially on a first signal as received by the receive antenna at a first time, a second signal as received by the receive antenna at a second time, and a distance traveled by the drill string between the first and the second times. A homogeneous part of the electromagnetic signal may be reduced, to thereby increase a depth of detection of the characteristic.

22 Claims, 32 Drawing Sheets

(56) References Cited

U.S. PATENT DOCUMENTS

| | | | |
|---|---|---|---|
| 3,605,920 A | | 9/1971 | Woodward |
| 4,300,098 A | * | 11/1981 | Huchital et al. ............ 324/338 |
| 4,393,350 A | | 7/1983 | Hansen et al. |
| 4,578,675 A | | 3/1986 | MacLeod |
| 4,596,143 A | | 6/1986 | Norel |
| 4,609,873 A | * | 9/1986 | Cox et al. .................. 324/338 |
| 4,735,269 A | | 4/1988 | Park et al. |
| 4,940,943 A | | 7/1990 | Bartel et al. |
| 5,050,690 A | | 9/1991 | Smith |
| 5,095,273 A | | 3/1992 | Kennedy et al. |
| 5,235,285 A | | 8/1993 | Clark et al. |
| 5,339,036 A | | 8/1994 | Clark et al. |
| 5,508,616 A | | 4/1996 | Sato et al. |
| 5,726,951 A | | 3/1998 | Birchak et al. |
| 6,006,844 A | | 12/1999 | Puymbroeck et al. |
| 6,176,323 B1 | | 1/2001 | Weirich et al. |
| 6,181,138 B1 | | 1/2001 | Hagiwara et al. |
| 6,304,086 B1 | * | 10/2001 | Minerbo et al. ............ 324/338 |
| 6,374,925 B1 | | 4/2002 | Elkins et al. |
| 6,480,118 B1 | | 11/2002 | Rao |
| 6,710,601 B2 | | 3/2004 | Rosthal et al. |
| 6,778,127 B2 | | 8/2004 | Stolarczyk et al. |
| 6,788,066 B2 | | 9/2004 | Wisler et al. |
| 6,791,469 B1 | | 9/2004 | Rao et al. |
| 6,819,110 B2 | | 11/2004 | Omeragic et al. |
| 6,944,547 B2 | | 9/2005 | Womer et al. |
| 6,958,610 B2 | | 10/2005 | Gianzero |
| 7,046,165 B2 | | 5/2006 | Beique et al. |
| 7,138,839 B2 | | 11/2006 | Zachan et al. |
| 7,185,719 B2 | | 3/2007 | Van Riet |
| 7,265,649 B1 | | 9/2007 | Hall et al. |
| 7,350,568 B2 | | 4/2008 | Mandal et al. |
| 7,414,406 B2 | | 8/2008 | Banning et al. |
| 7,436,184 B2 | | 10/2008 | Moore |
| 7,612,565 B2 | | 11/2009 | Seydoux et al. |
| 7,665,542 B2 | | 2/2010 | Stockton |
| 8,072,221 B2 | | 12/2011 | Snyder, Jr. et al. |
| 2001/0046811 A1 | | 11/2001 | Fleury et al. |
| 2001/0050559 A1 | | 12/2001 | Wisler et al. |
| 2002/0169559 A1 | | 11/2002 | Onyia et al. |
| 2003/0168257 A1 | | 9/2003 | Aldred et al. |
| 2004/0183538 A1 | * | 9/2004 | Hanstein et al. ............ 324/339 |
| 2005/0252286 A1 | | 11/2005 | Ibrahim et al. |
| 2006/0017443 A1 | | 1/2006 | Folberth et al. |
| 2006/0244455 A1 | | 11/2006 | Bittar |
| 2007/0168056 A1 | | 7/2007 | Shayegi et al. |
| 2007/0256832 A1 | | 11/2007 | Hagiwara et al. |
| 2007/0285274 A1 | | 12/2007 | Esmersoy |
| 2008/0297161 A1 | | 12/2008 | Gorek |
| 2009/0105955 A1 | | 4/2009 | Castillo et al. |
| 2009/0150076 A1 | | 6/2009 | Taherian et al. |
| 2009/0224764 A1 | | 9/2009 | Bittar |
| 2010/0000792 A1 | | 1/2010 | Alberty |
| 2010/0179762 A1 | * | 7/2010 | Tabarovsky et al. ............ 702/7 |
| 2012/0081121 A1 | | 4/2012 | Maurer et al. |
| 2012/0186873 A1 | | 7/2012 | Shayegi et al. |
| 2013/0113487 A1 | | 5/2013 | Bittar et al. |
| 2013/0113488 A1 | | 5/2013 | Bittar et al. |

OTHER PUBLICATIONS

International Search Report with Written Opinion issued Nov. 25, 2009 for International Patent Application No. PCT/US09/059541, 8 pages.
International Search Report with Written Opinion issued Nov. 30, 2009 for International Patent Application No. PCT/US09/059534, 8 pages.
International Search Report with Written Opinion issued Jun. 1, 2010 for International Patent Application No. PCT/US10/036851, 9 pages.
Specification for U.S. Appl. No. 13/391,833, filed Feb. 23, 2012, 3 pages.
Drawings for U.S. Appl. No. 13/391,833, filed Feb. 23, 2012, 3 pages.
International Search Report with Written Opinion issued Dec. 3, 2010 for PCT Patent Application No. PCT/US10/051384, 8 pages.
International Search Report with Written Opinion issued Aug. 30, 2012 for PCT Patent Application No. PCT/US11/059947, 9 pages.
International Search Report with Written Opinion issued Aug. 30, 2012 for PCT Patent Application No. PCT/US11/059950, 10 pages.
V.A. Akinbinu; "Prediction of fracture gradient from formation pressures and depth using correlation and stepwise multiple regression techniques", Journal of Petroleum Science and Engineering, dated Feb. 16, 2010, 8 pages.
International Preliminary report on Patentability issued Apr. 19, 2012 for PCT Patent Application No. PCT/US10/051384, 7 pages.
W.A. Zoeller; "Pore Pressure Detection From the MWD Gamma Ray", SPE 12166, dated Oct. 5-8, 1983, 12 pages.
Office Action issued May 29, 2014 for U.S. Appl. No. 13/659,250, 29 pages.
Notice of Allowance issued Jun. 6, 2014 for U.S. Appl. No. 13/659,273, 10 pages.
Office Action issued May 15, 2014 for U.S. Appl. No. 13/144,321, 23 pages.
Office Action issued Apr. 17, 2014 for U.S. Appl. No. 13/659,273, 44 pages.
Office Action issued Mar. 10, 2014 for U.S. Appl. No. 13/659,250, 39 pages.
Office Action issued Dec. 18, 2013 for U.S. Appl. No. 13/659,250, 30 pages.
Office Action issued Jan. 15, 2014 for U.S. Appl. No. 13/659,273, 38 pages.

* cited by examiner

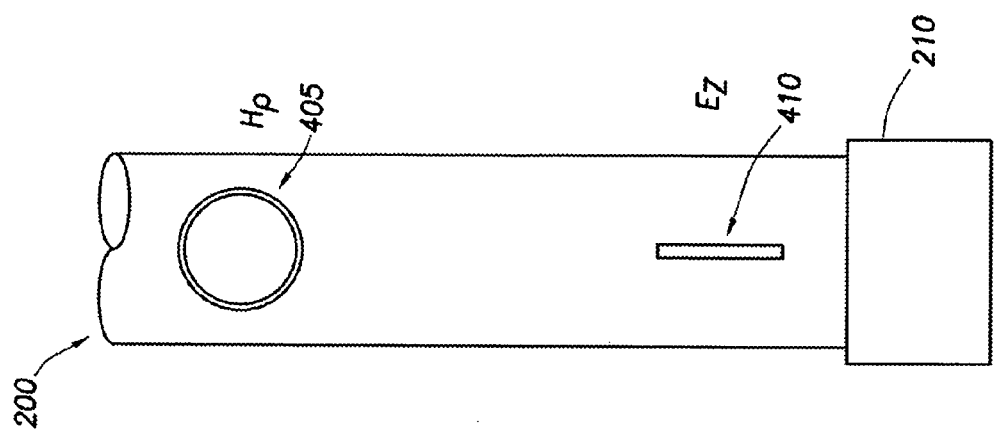
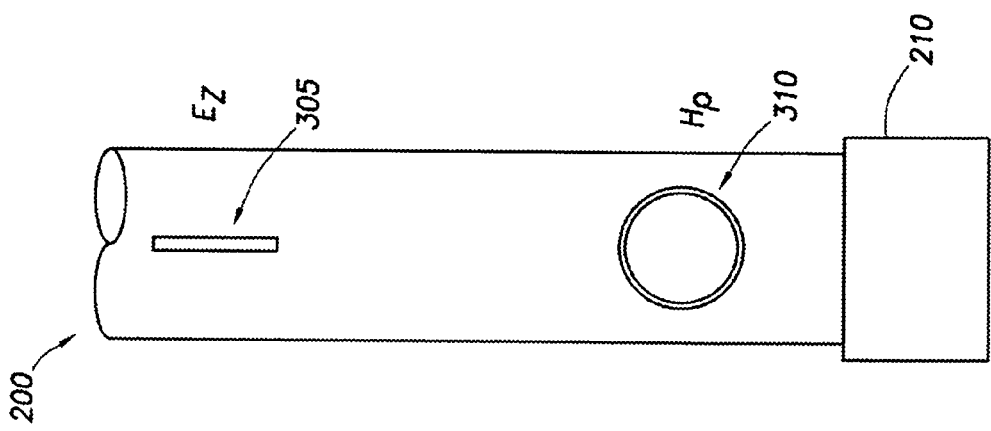

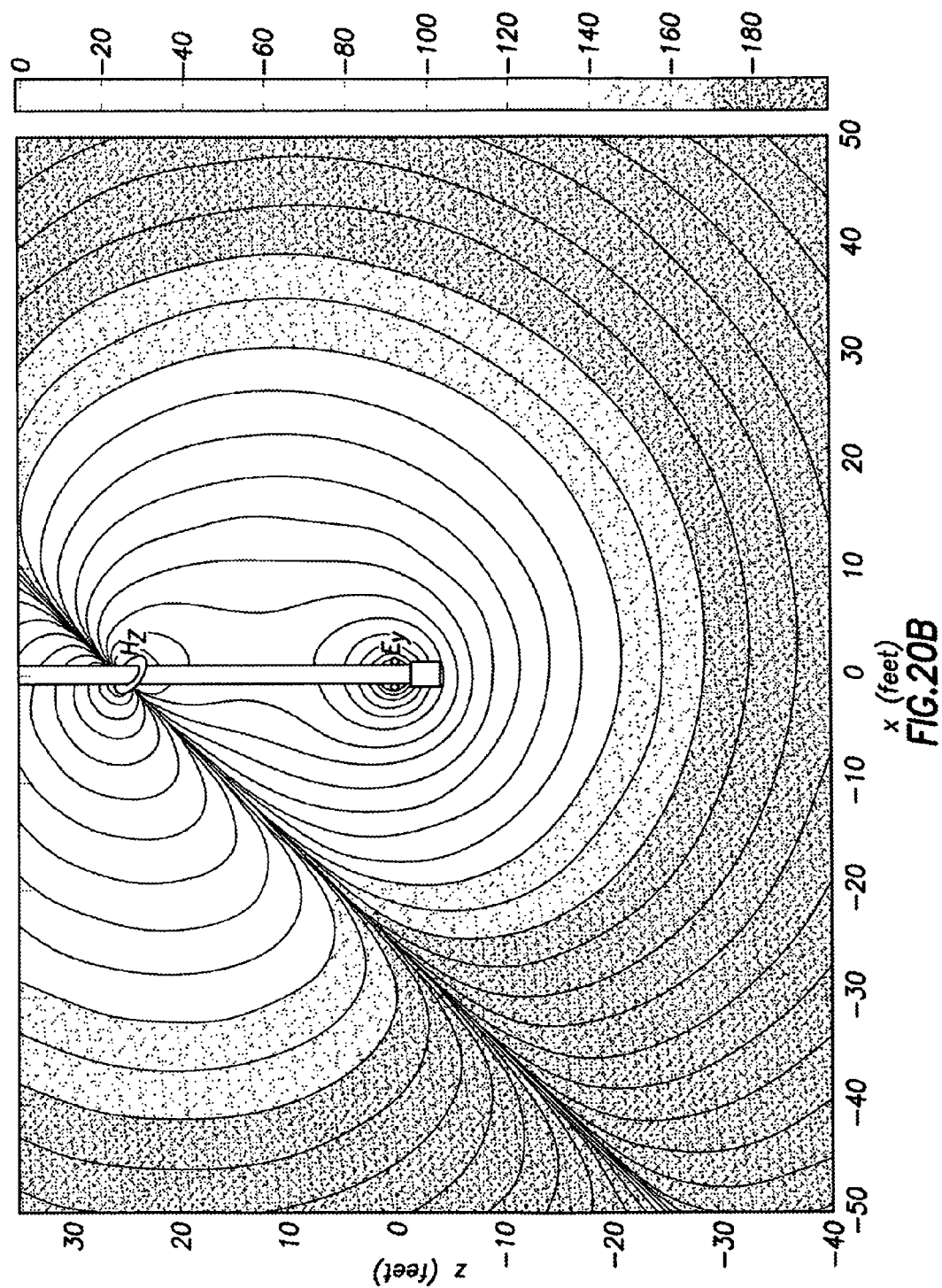

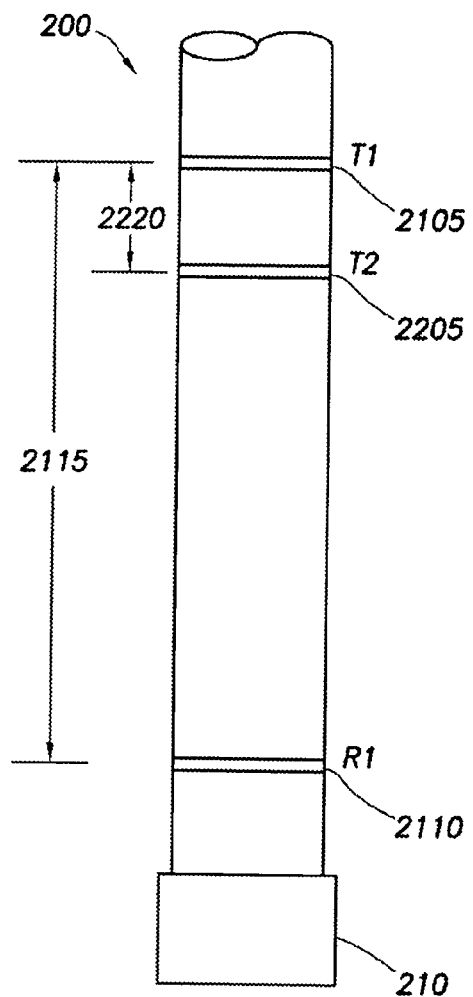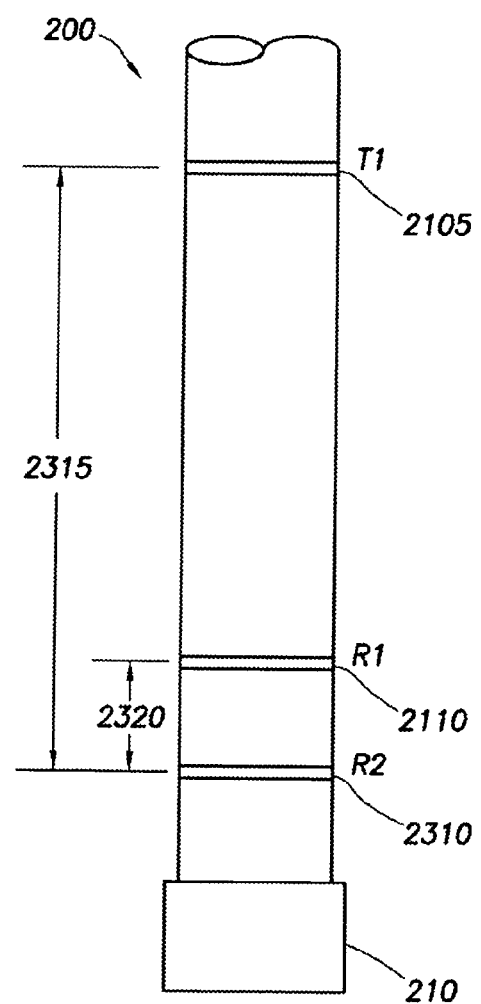

DOWNHOLE SENSING IN BOREHOLE ENVIRONMENTS

TECHNICAL FIELD

The present disclosure relates generally to the drilling of subterranean wells and, in an embodiment described herein, more particularly provides a method of sensing a characteristic of a region of an earth formation located along a trajectory of the drill string and/or radially outward from the drill string.

BACKGROUND

As oil well drilling becomes increasingly complex, the importance of collecting and analyzing downhole data while drilling increases. During the drilling of a wellbore, it would be desirable to accurately sense characteristics of a region of an earth formation that has not yet been penetrated by the drill bit. The farther a driller can sense ahead of and around the drill string, the better the driller can control the drilling process.

BRIEF DESCRIPTION OF THE DRAWINGS

FIGS. 3-7 are schematic diagrams of various transmit and receive antenna configurations.

FIGS. 20A & 20B are plots of detection sensitivity patterns for two different antenna configurations.

FIGS. 21-24 are schematic diagrams of various antenna configurations for downhole sensing tools.

DETAILED DESCRIPTION

Figure 1:
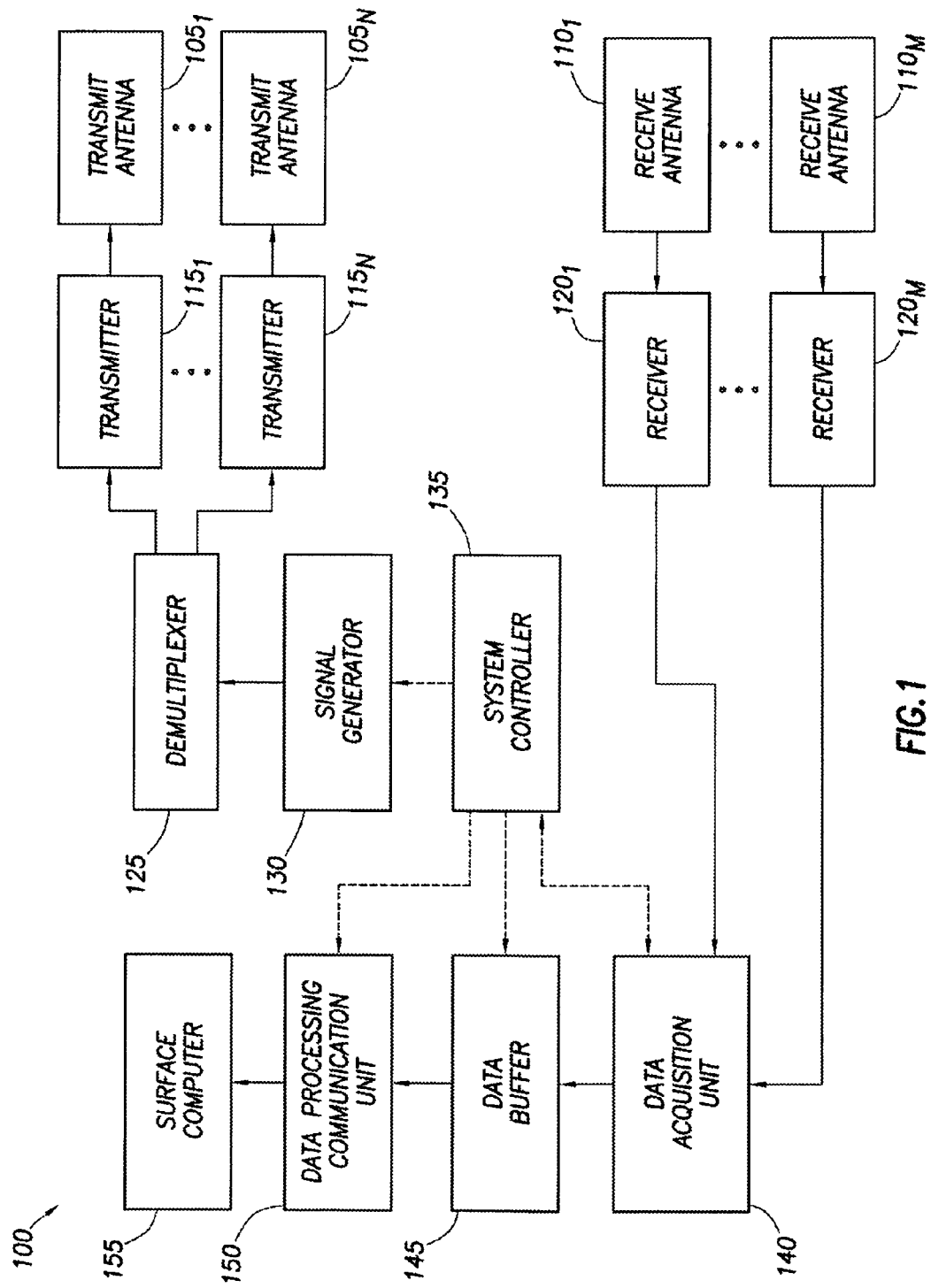
FIG. 1 shows a system for downhole data acquisition which can embody principles of the present disclosure.

FIG. 1 representatively and schematically illustrates a system 100 for downhole sensing of resistive anomalies. It should be clearly understood, however, that the system 100 as depicted in FIG. 1 and described herein is merely one example of a wide variety of systems which can embody the principles of this disclosure. Thus, the principles of this disclosure are not to be limited in any manner to the specific details of the system 100, or any other systems or methods described herein.

As used herein, a "resistive anomaly" is a subterranean region which has a detectable difference in resistivity from an adjacent subterranean region. Resistive anomalies include localized anomalies, such as pockets, cavities, inclusions, fractures, etc. Resistive anomalies also include boundaries between different earth formations or strata, such as faults, gas-oil contacts, oil-water contacts, salt domes, etc.

The system 100 includes at least one transmit antenna $105_{1-N}$ and at least one receive antenna $110_{1-M}$. As used herein, the term "antenna" is defined as a conductor by which an electromagnetic signal is sent out or received.

Transmit antenna $105_{1-N}$ is driven by transmitter $115_{1-N}$. Each transmitter $115_{1-N}$ transmits at least one signal at a particular frequency. The transmitted frequency may be between 1 Hz and 120 kHz. The transmitted frequency may be between 5 kHz and 60 kHz.

Multiple signals may be transmitted at different frequencies, such as 5 kHz, 15 kHz, and 45 kHz. In some cases, the selected frequency may be limited due to drilling noise and/or the microphone effect.

In the system shown in FIG. 1, signals for transmission by the transmitters $115_{1-N}$ are generated by a signal generator 130, which is selectively coupled to the transmitters $115_{1-N}$ by demultiplexer 125. Multiple signal generators 130 may be used to drive the transmitters $115_{1-N}$. Alternatively, the transmitters $115_{1-N}$ may each perform the function of the signal generator 130, and the separate signal generator 130 may be omitted.

The system 100 shown in FIG. 1 further includes at least one receive antenna $110_{1-M}$. Each receive antenna $110_{1-M}$ may be coupled to a dedicated receiver $120_{1-M}$ or a single receiver 120 may be coupled to multiple receive antennas $110_{1-M}$.

Note that the number M of receive antennas may be the same as, or different from, the number N of transmit antennas. It is also not necessary for the number of receive antennas $110_{1-M}$ to be the same as the number of receivers $120_{1-M}$, or for the number of transmit antennas $105_{1-N}$ to be the same as the number of transmitters $115_{1-N}$. Any number of these elements may be used in keeping with the principles of this disclosure.

Receivers $115_{1-N}$ are coupled to data acquisition unit 140. The data acquisition unit 140 determines an amplitude and/or a phase of a received signal. The acquired signal information may be stored, along with acquisition time information in optional buffer 145. Buffer 145 may be useful when formation characteristics are determined based on signals received at different times and/or at different azimuthal positions of the drill string 200.

Data processing may be performed at the surface or downhole. If the data processing is to be performed at the surface, the acquired signal information from data acquisition unit 140 and the buffered signal information from data buffer 145 may be input into the data processing communications unit 150 for transmission to surface computer 155. If the data processing is to be performed downhole, a system controller 135 or a separate downhole computer (not shown) may be used to perform the data processing.

The surface computer 155, the system controller 135, or the downhole computer may include multiple processors and a memory. The memory has stored therein at least one computer program with executable instructions that cause the processor(s) to perform the data processing on the received signals.

The system controller 135 is coupled to various components of the system 100. The system controller 135 may control the frequencies generated by the signal generator 130 or the transmitters $115_{1-N}$. The system controller 135 may also control the timing of the transmitters $115_{1-N}$. For example, the system controller 135 may cause the transmitters $115_{1-N}$ to operate sequentially or according to a predetermined transmission sequence.

Figure 2:
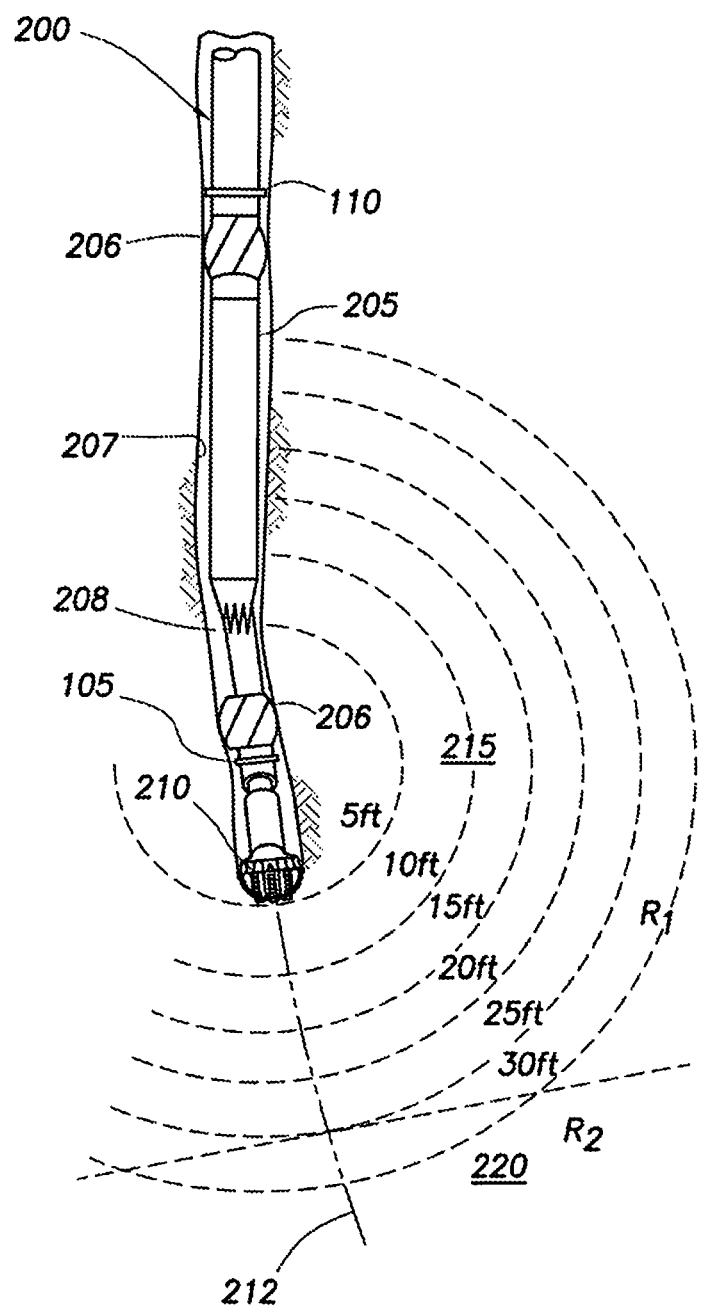
FIG. 2 illustrates a portion of a drill string, which includes transmit and receive antennas.

FIG. 2 is a representative illustration of a portion of a drill string 200 in a wellbore 207. An annulus 208 is formed between the drill string 200 and the wellbore 207. Drilling mud is pumped into the drill string 200, through a drill bit 210, and returned to the surface via an annulus 208.

A transmit antenna 105 and a receive antenna 110 are mounted on the drill string 200. In this example, the transmit antenna 105 and the receive antenna 110 are mounted so that they rotate together when the drill string 200 rotates. In other examples, each of the antennas 105, 110 may not rotate, may not rotate at the same rate as the other antenna, or may rotate at the same rate as the other antenna.

The drill string 200 also includes a drilling device 205 and stabilizers 206. The drilling device 205 may include a drill motor and/or a rotary steerable device.

As depicted in FIG. 2, the drill bit 210 is penetrating an earth formation bed region 215 that has a formation resistivity of $R_1$. The drill string 200 is approaching a second earth formation bed region 220 with a formation resistivity of $R_2$. The second region 220 has a dipping orientation relative to the region 215.

The difference in the resistivities of region 215 and region 220 affects the signal that is returned to the receive antenna 110 when a signal is transmitted into the region of the formation ahead of the drill string 200 (e.g., along an intended trajectory 212 of the drill string) by the transmit antenna 105.

Due to reciprocity, transmit and receive functionalities of the antennas 105, 110 may be interchanged. The transmit antenna 105 may be mounted on or above the drilling device 205 and the receive antenna 110 may be mounted on or below the drilling device 205.

However, the placement of the transmit antenna 105 and the receive antenna 110 may be reversed, such that the transmit antenna 105 is located above the receive antenna 110. For example, the transmit antenna 105 may be mounted on or above the drilling device 205 and the receive antenna 110 may be mounted on or below the drilling device 205.

The transmit antenna 105 and the receive antenna 110 are typically mounted within a protective groove or channel on the outside of the drill string 200. The antennas 105, 110 are preferably mounted in a manner whereby the mechanical integrity of the drill string 200 is not compromised.

The transmit antenna 105 or the receive antenna 110 may be mounted in close proximity to the drill bit 210, with a relatively large spacing between the transmit antenna 105 and the receive antenna 110, to improve the depth of detection. As used herein, the "depth of detection" is the distance from the lowest antenna (closest to the drill bit 210) to the detected resistive anomaly.

A transmit antenna 105 and/or a receive antenna 110 may approximate a magnetic dipole. As used herein, a "magnetic dipole" is defined as a pair of magnetic poles, of equal magnitude but of opposite polarity, separated by a relatively small distance.

The transmit antenna 105 and/or the receive antenna 110 may comprise, for example, a magnetometer, or a coil or a solenoid antenna to approximate a magnetic dipole. A magnetic dipole antenna is referenced by the letter "H".

A magnetic dipole antenna may be mounted coaxially with the drill string 200. Such an antenna is referred to as an $H_Z$ antenna.

An $H_Z$ antenna may be tilted relative to the drill string 200 to provide both co-polarization and cross-polarization effects with another antenna. Tilting a coil antenna also repositions blind area(s) caused by the electromagnetic flux pattern.

A magnetic dipole antenna may also be mounted in a perpendicular orientation to the axis of the drill string 200. Such an antenna is referred to as an $H_\rho$ antenna.

A transmit antenna 105 and/or a receive antenna 110 may approximate an electric dipole. As used herein, an "electric dipole" is defined as a pair of electric charges, of equal magnitude but of opposite sign, separated by a relatively small distance.

A transmit antenna 105 and/or a receive antenna 110 may comprise, for example, a wire antenna, a toroidal antenna, a button electrode, or a ring electrode to approximate an electric dipole. An electric dipole antenna is referenced by the letter "E".

An electric dipole antenna may be mounted in a parallel orientation with the axis of the drill string 200. Such an antenna is referred to as an $E_Z$ antenna.

An electric dipole antenna may also be mounted in a perpendicular orientation to the axis of the drill string 200. Such an antenna is referred to as an $E_X$ or an $E_Y$ antenna, depending on the direction in which the antenna is pointing.

FIGS. 3-7 are schematic diagrams of various transmit and receive antenna combinations mounted on a drill string 200. In each of FIGS. 3-7, the drill bit 210 is shown as a rectangular block at the end of the drill string 200.

The drill string 200 shown in FIG. 3 includes an $E_Z$ transmit antenna 305 and an H$\rho$ receive antenna 310. This combination may be referred to as an $E_Z H_\rho$ configuration.

The drill string 200 shown in FIG. 4 includes an $H_\rho$ transmit antenna 405 and an $E_Z$ receive antenna 410. This combination may be referred to as an $H_\rho E_Z$ configuration. Although the $E_Z$ and the $H_\rho$ antennas in FIGS. 3 and 4 are shown as being mounted on the same side of the drill string 200, the antennas may be offset if desired by mounting them in different azimuthal positions on the drill string 200.

Figure 5:
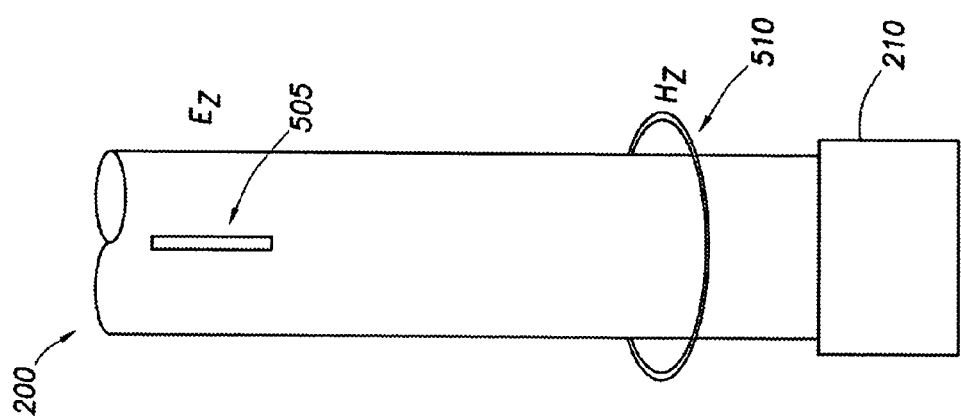

The drill string 200 shown in FIG. 5 includes an $E_Z$ transmit antenna 505 and a $H_Z$ receive antenna 510. This combination may be referred to as an $E_Z H_Z$ configuration. The combined use of E and H antennas results in a hybrid sensor that is neither purely conductive nor purely inductive.

The combined use of E and H antennas reduces the homogeneous part of the electromagnetic signal, such as direct fields and formation fields, thereby improving sensitivity to resistive anomalies. All of the E and H antenna configurations shown in FIGS. 3-5 provide cross-polarization effects between the respective transmit and receive antennas.

Figure 6:
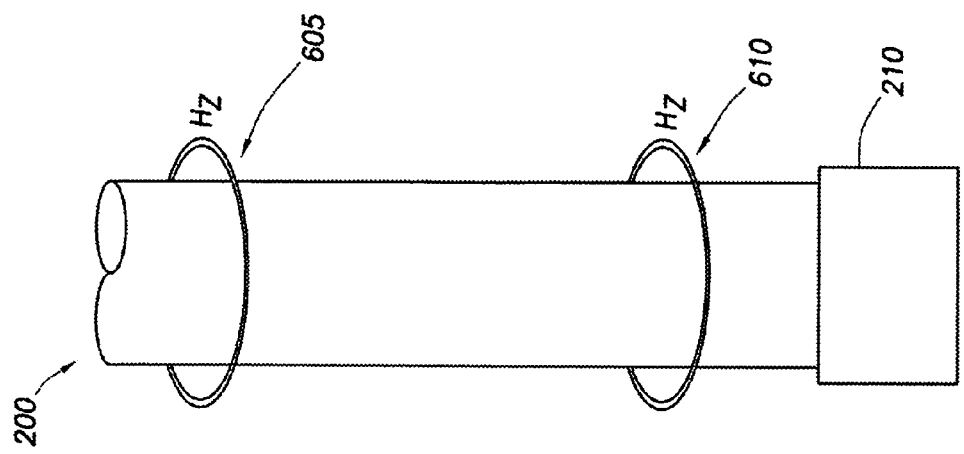

FIG. 6 shows a drill string 200 including an $H_Z$ transmit antenna 605 and an $H_Z$ receive antenna 610. This combination may be referred to as a $H_Z H_Z$ configuration. The antenna configuration in FIG. 6 provides co-polarization effects between the transmit and receive antennas, since both H antennas are centered on the same Z axis.

Figure 7:
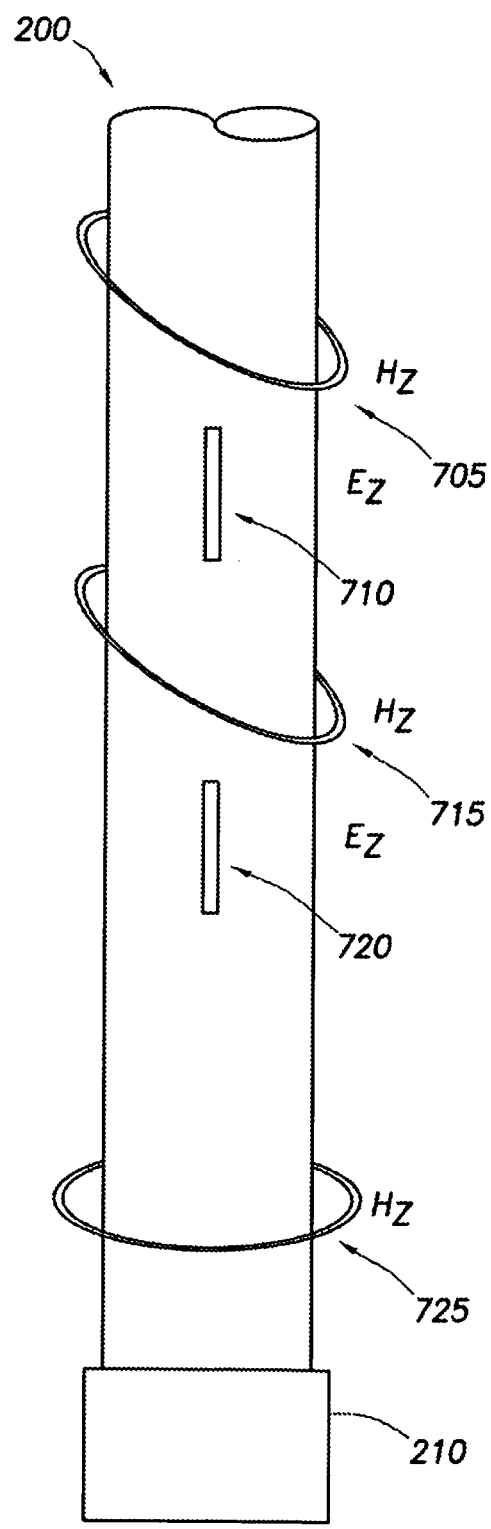

The system 100 may include multiple transmit antennas 105 and/or multiple receive antennas 110. FIG. 7 shows one such arrangement.

The drill string 200 shown in FIG. 7 includes a tilted $H_Z$ transmit antenna 705, an $E_Z$ transmit antenna 710, a second tilted $H_Z$ transmit antenna 715, a second $E_Z$ transmit antenna 720, and an $H_Z$ receive antenna 725. The antenna configuration in FIG. 7 provides both co-polarization and cross-polarization effects between the multiple transmit antennas and the single receive antenna.

In this particular example, the second tilted $H_Z$ transmit antenna 715 provides a reference signal, which may be used to compensate for temperature effects, borehole effects, and/or mandrel effects. The second tilted $H_Z$ transmit antenna 715 may also act as a bucking coil to reduce direct field effects. The second $E_Z$ transmit antenna 720 is used to produce spatial diversity.

Figure 8:
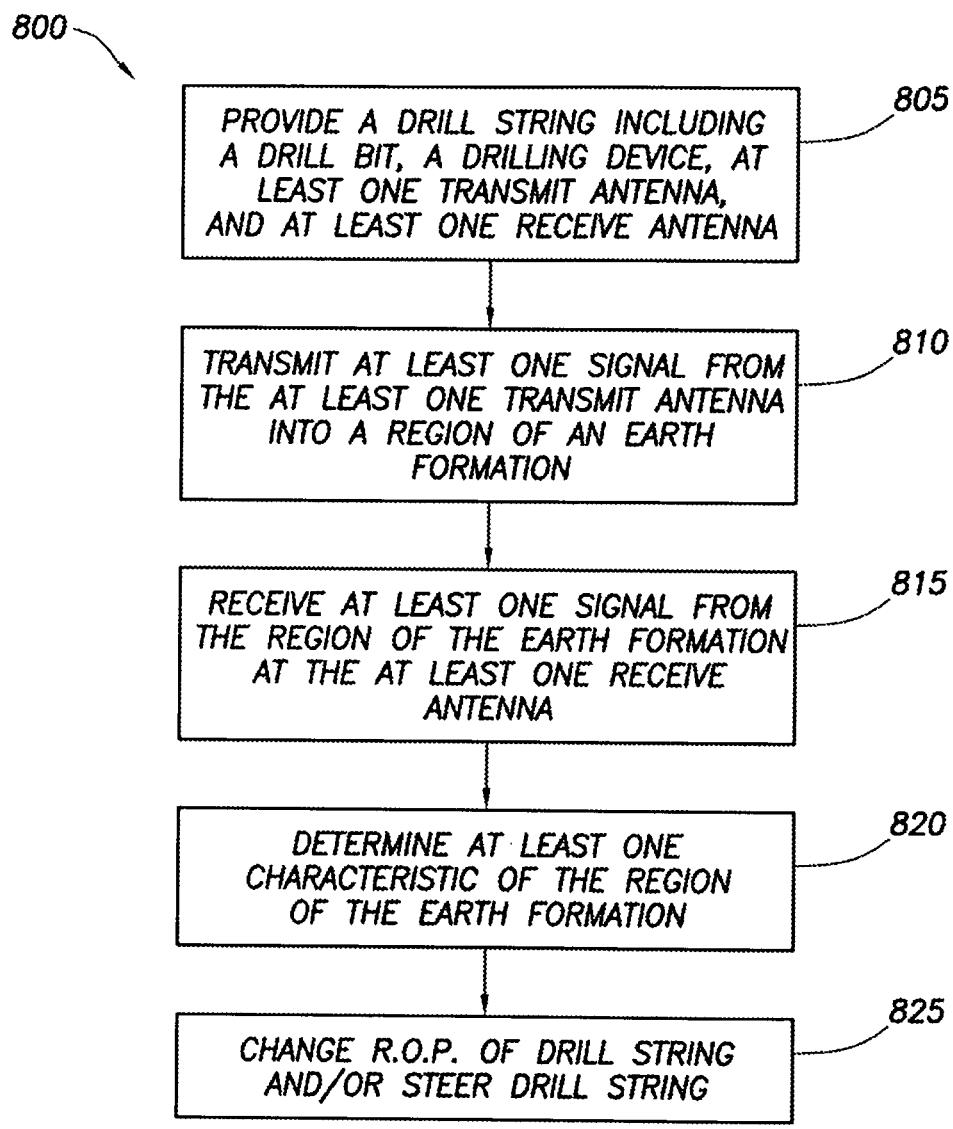
FIGS. 8-10 are flow charts of methods which may be used for downhole sensing and determining a characteristic of a region of an earth formation.

FIG. 8 is a flow chart of a method 800 for downhole sensing and drill string control, with the method embodying principles of this disclosure. In this example, a drill string 200 is provided which includes a drill bit 210, a drilling device 205, at least one transmit antenna 105, and at least one receive antenna 110 (block 805).

The method 800 includes transmitting at least one signal into a region of an earth formation 215, 220 from the at least one transmit antenna 105 (block 810). The region of the earth formation 215, 220 may be located ahead of the drill string 200 (e.g., along an intended trajectory 212 of the drill string). Alternatively, or in addition, the region of the earth formation 215, 220 may be located radial to the drill string 200.

The method 800 further includes receiving at least one signal from the region of the earth formation 215, 220 at the at least one receive antenna 110 (block 815). The method 800 may include buffering the data from at least one received signal and using the signal data at a later time. Buffered signal data may correspond to specific azimuthal positions of the antennas, if the drill string 200 is rotating.

In block 820, the system 100 determines at least one characteristic of the region of the earth formation 215, 220 using data from the signal received in block 815. The method 800 may further include, at block 825, changing a rate of penetration (ROP) of the drill string 200 and/or steering the drill string 200 in response to the characteristic determined in block 820.

For example, the speed and/or direction of the drill bit 210 may be altered to avoid a blowout, to keep the drill string 200 from exiting a specific bed, and/or to direct the drilled borehole into a more advantageous or productive portion of a bed, etc. Communication between surface and downhole equipment while drilling typically involves some delay (although wired drill pipe or electromagnetic telemetry may be used to significantly reduce that delay).

Additionally, steering the drill string 200 has its own physical limitations. Therefore, the greater the distance at which a resistive anomaly is detected, the more time the drilling operator has to make appropriate adjustments to the drilling process, such as a steering correction to properly guide the trajectory 212 of the drill string 200.

Figure 9A:
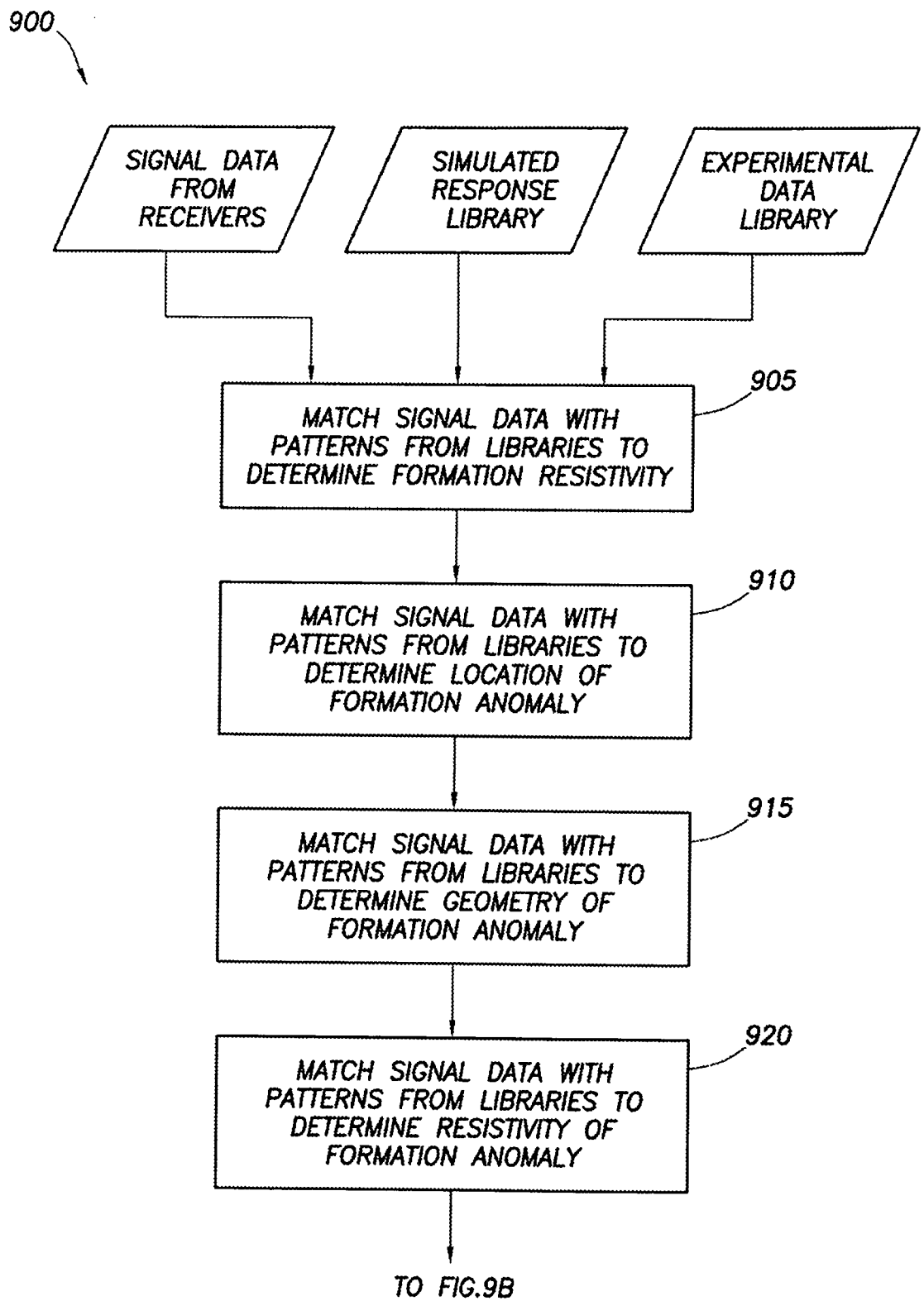
Figure 9B:
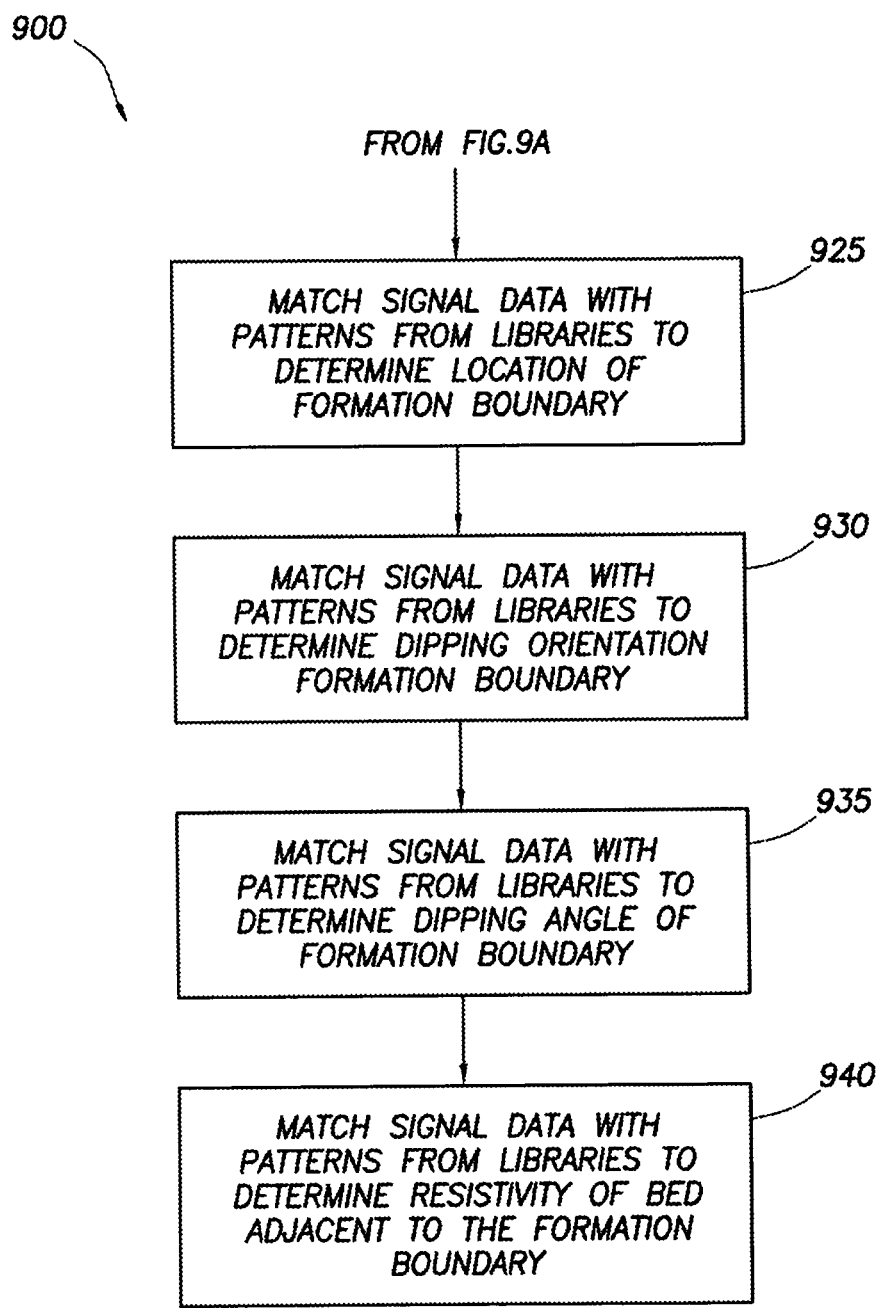

A method 900 for determining at least one characteristic of a region of an earth formation 215, 220 from the received signal data is shown in FIGS. 9A & 9B. In this example, the system 100 obtains data representative of the region of the earth formation 215, 220 in the form of one or more received signals from at least one receive antenna 110.

The received signal(s) may be expressed in terms of amplitude and/or phase data. Signal data from at least one transmit and receive antenna combination is used to determine the characteristic. Signal data received at different times from at least one transmit and receive antenna combination, as well as the distance traveled by the transmit and receive antennas during the time interval, may also be used to determine the characteristic.

Co-polarization, cross-polarization, or a combination of co-polarization and cross-polarization effects between a transmit antenna 105 and a receive antenna 110 may be used to obtain usable signal data from a region of an earth formation 215, 220. Signal data may be compared to patterns from a simulated response library and/or an experimental data library to determine the characteristic.

For example, in block 905, the system may match signal data with patterns from the simulated response library and/or the experimental data library to determine a resistivity of a region of the formation 215, 220. The system may match signal data with patterns from the simulated response library and/or the experimental data library to determine a location of a formation anomaly (block 910), a geometry of the formation anomaly (block 915), and/or a resistivity of the formation anomaly (block 920).

The system may match signal data with patterns from the simulated response library and/or the experimental data library to determine a location of a formation boundary (block 925), a dipping orientation of the formation boundary (block 930), a dipping angle of the formation boundary (block 935), and/or a resistivity of a bed adjacent to the formation boundary (block 940).

One or more computer programs may be used to perform the method 900 to determine at least one characteristic of a region of an earth formation 215, 220. Signal data may be processed as raw data and/or as an arithmetic function (e.g. a ratio, product, difference, sum, power, etc.) of the signal data that is received from different transmit and receive antenna combinations and/or from at least one transmit and receive antenna combination at different times.

Figure 10:
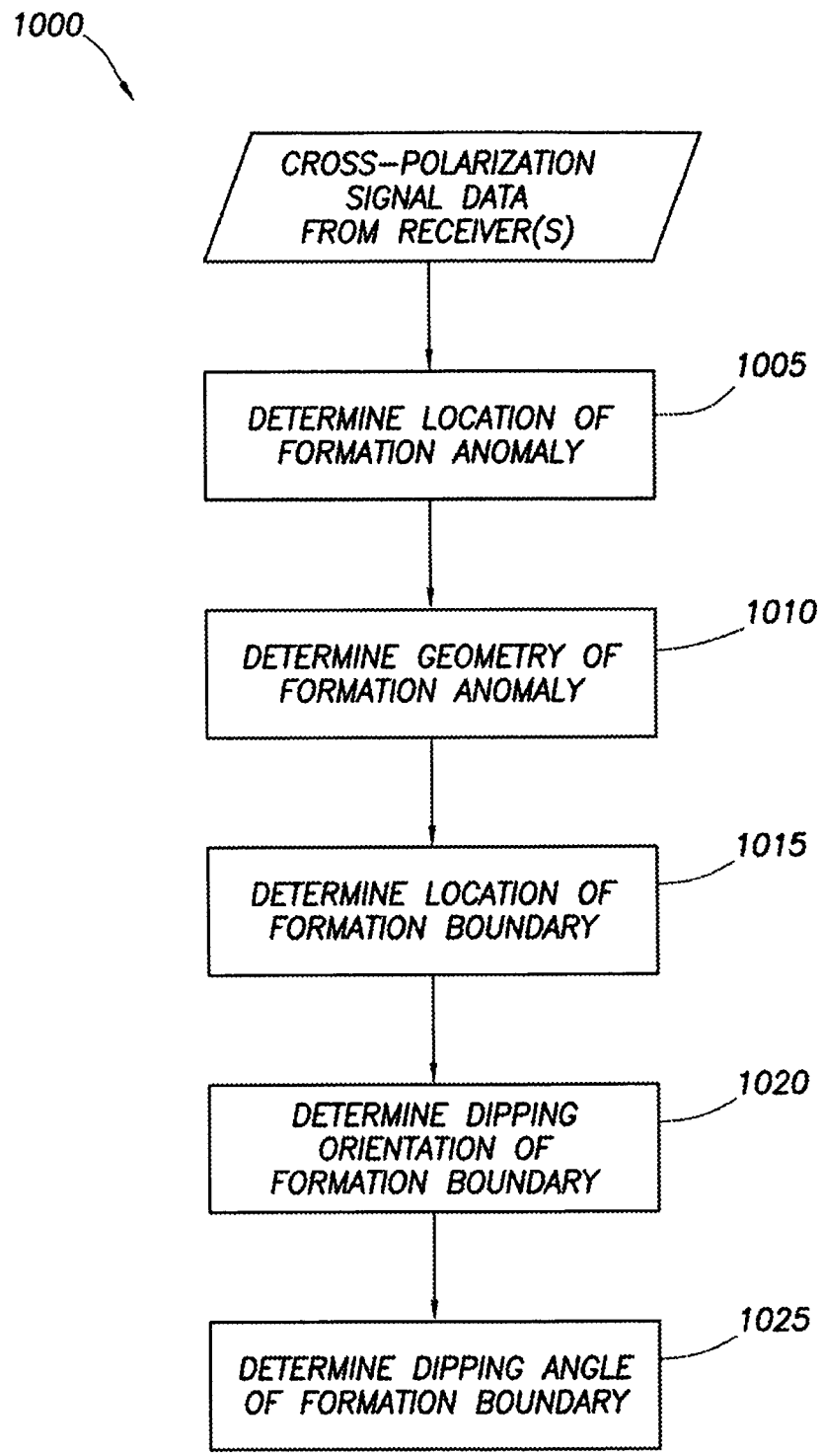

As shown in FIG. 10, an analytical method 1000 may be used with cross-polarization signal data to determine the location, geometry, and/or orientation of a resistive anomaly in a region of an earth formation 215, 220. In this example, the method 1000 may determine a location of a formation anomaly (block 1005), a geometry of a formation anomaly (block 1010), a location of a formation boundary (block 1015), a dipping orientation of a formation boundary (block 1020), and/or a dipping angle of a formation boundary (block 1025).

The cross-polarization signal data may be from one or more transmit/receive antenna combinations at one or more times. Anomaly orientation information may also be obtained by observing azimuthal variations in the received signal data as the drill string 200 rotates during drilling.

Method 1000 uses phase data generated from at least one transmit antenna 105 and receive antenna 110 combination operating in a cross-polarization configuration. Signal data may be obtained at multiple frequencies.

Method 1000 may determine the location, the geometry, and/or the orientation of a resistive anomaly in a region of an earth formation 215, 220 using the following sets of equations. One or more computer programs may be used to determine at least one characteristic of a region of an earth formation 215, 220 by solving the equations of the method 1000.

$$P(\bar{x}) = \prod_{j=1}^{N_t} \prod_{i=1}^{N_\omega} [\cos(\text{Phase}(\bar{Y}(\omega_i, \bar{x}_{tj}, \bar{x}_r, \bar{x})) - \text{Phase}(R_{i,j})) + 1]^k \quad (1)$$

In equation (1), Y is the cross-polarization response from the resistive anomaly associated with frequency $\omega_i$, location $x_{tj}$ of transmit antenna j, location $x_r$ of receive antenna r, and location x of the anomaly. $R_{i,j}$ is the received response at the $i^{th}$ frequency for the $j^{th}$ transmit antenna. Each set of i and j values may be used to produce an image. The sharpness of the image can be controlled by k. The individual images may be combined through multiplication to produce the final anomaly image P(x).

The cross-polarization response (Y) can be calculated by electromagnetic simulation for any type of antenna or the cross-polarization response (Y) can be approximated analytically using equation (2) in the case of a z-directed coil antenna ($H_Z$). This expression for Y is obtained by taking advantage of the anti-symmetry that exists in the cross-polarization response.

$$\overline{Y}(\omega_i, \overline{x}_{tj}, \overline{x}_r, \overline{x}) = \qquad (2)$$
$$S(\omega_i) CrossPol(\overline{G}_{tran}(\omega_i, \overline{x}_{tj}, \overline{x} + \hat{\phi} d), -\hat{r}) \cdot \overline{G}_{rec}(\omega_i, \overline{x} + \hat{\phi} d, \overline{x}_r) +$$
$$S(\omega_i) CrossPol(\overline{G}_{tran}(\omega_i, \overline{x}_{tj}, \overline{x} - \hat{\phi} d), -\hat{r}) \cdot \overline{G}_{rec}(\omega_i, \overline{x} - \hat{\phi} d, \overline{x}_r),$$

where, $$CrossPol(\overline{a}, \overline{b}) = (\overline{a} \cdot \hat{b})\left(\hat{b} - \frac{(\overline{a} \cdot \hat{b})\overline{a}}{|\overline{a}|^2}\right),$$

$$\hat{r} = \frac{\overline{x} - \overline{x}_{tj}}{|\overline{x} - \overline{x}_{tj}|},$$

and $$\hat{\phi} = \frac{\hat{r} \times \hat{z}}{|\hat{r} \times \hat{z}|}.$$

In equation (2), $G_{tran}$ and $G_{rec}$ are dyadic Green's functions associated with the transmit antenna and the receive antenna, respectively; ● is the inner product operation; $S(\omega)$ is the scattering coefficient associated with the boundary; d is the spatial separation between positive and negative cross-polarization fields. The value for d can be estimated as being on the order of magnitude of skin depth. The maximum of this function estimates anomaly location.

In an example situation with a dipping formation boundary where a signal is transmitted from the transmit antenna 105 and received by the receive antenna 110, the majority of the received signal comes from the area of the formation boundary that is closest to both the transmit antenna 105 and the receive antenna 110 (i.e. the point on the boundary plane that produces the smallest sum of distances from the transmit antenna 105 to the boundary and from the boundary to the receive antenna 110). The following equations (3) can be used to determine the location, geometry, and orientation characteristics of the detected resistive anomaly.

$$\text{location of anomaly } \overline{x}_a = \text{argmax}(P(\overline{x})) \qquad (3)$$
$$\text{distance from receive antenna to anomaly} = \|\overline{x}_a - \overline{x}_r\|$$
$$\text{elevation angle} = \text{angle}\left(\overline{x}_a - \frac{(\overline{x}_r + \overline{x}_t)}{2}\right)$$

Figure 11:
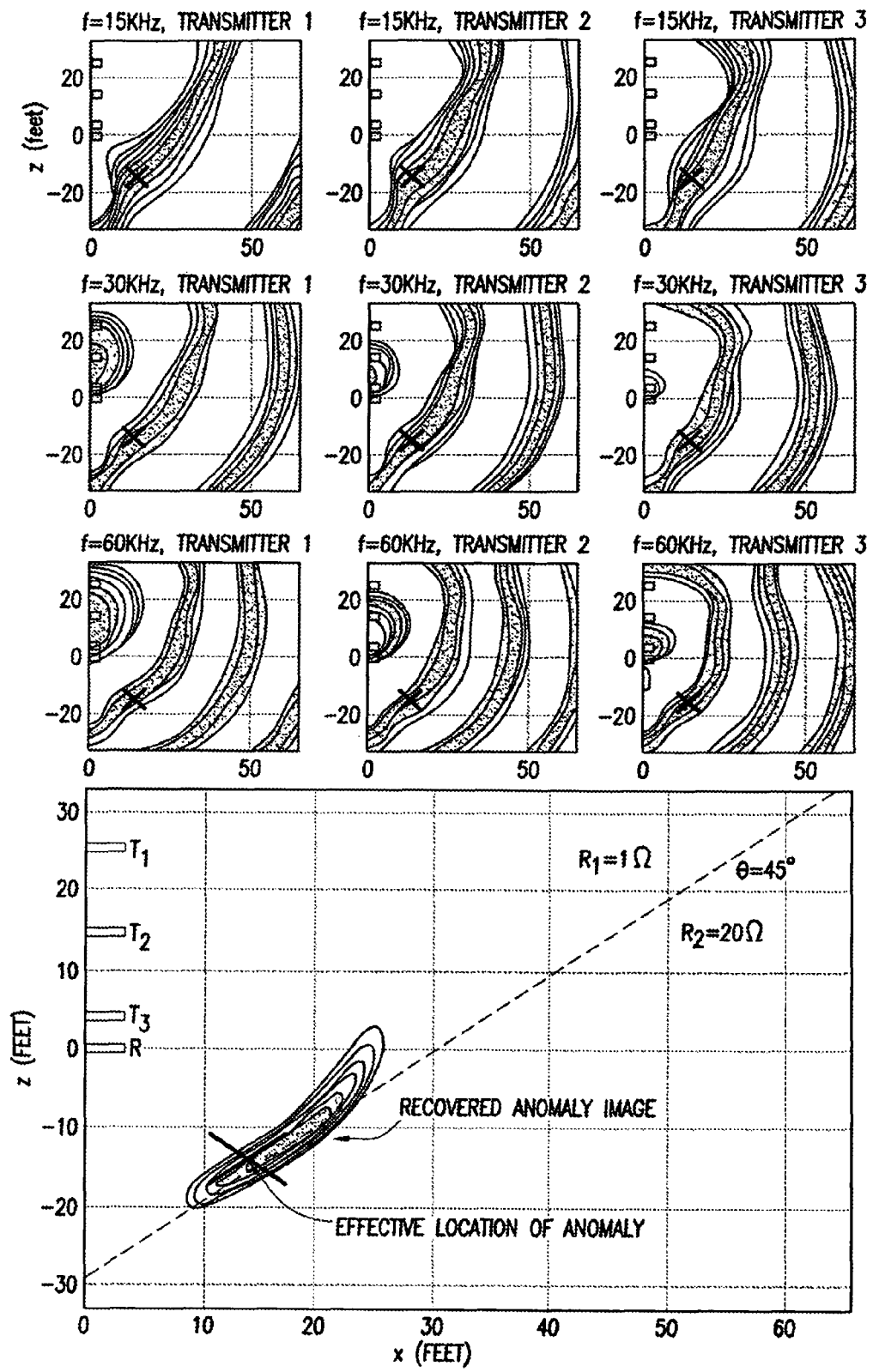
FIG. 11 is a set of images of a formation anomaly.

FIG. 11 provides an example of the results obtained from the method 1000. The system in FIG. 11 includes three transmit antennas 105 and a single receive antenna 110. The receive antenna 110 is a z-directed receiving coil ($H_Z$) and the transmit antennas 105 are wire antennas located at 304, 176, and 48 inches (7.7, 4.5, and 1.2 meters) above the receive antenna 110.

The example formation has a single dipping layer, adjacent beds with resistivity values $R_1=1\Omega$ and $R_2=20\Omega$, and a dipping angle of 45°. The top nine images are intermediate results, one for each combination of transmit antenna 105 and frequency used. The frequencies used in this example are 15 KHz, 30 KHz, and 60 KHz.

The transmit antennas 105 are shown as rectangles on the z-axis at their respective locations. The receive antenna 110 is shown as a rectangle located at z=0 feet (0 meters).

Each of the top nine plots correspond to images that are obtained for a single transmit antenna 105 at a single frequency. Due to lack of diversity and non-uniqueness in the solution, each individual image includes multiple bands. The spacing between the bands varies with the frequency.

The effective anomaly location is determined by combining all of the images and identifying the area which all of the individual images have in common. The bottom image in FIG. 11 is the result of combining the nine upper images.

The area in common from the nine individual images is the effective location of the anomaly. The effective anomaly location x has been superimposed on the nine individual images in FIG. 11 for reference.

The distance to the anomaly and the elevation angle is determined using equation (3). The elevation angle is for a line connecting the effective anomaly location to the midpoint of $T_1$ and R. Since the line is normal to the plane of the formation boundary, the dipping angle of the formation boundary is related to the elevation angle of the line.

As previously discussed, the method 1000 may be used in analyzing cross-polarization signal data only. The method may provide information regarding a location, a geometry, and/or an orientation of a resistive anomaly in a region of an earth formation 215, 220.

The method 900 may be employed when dealing with co-polarization signal data, cross-polarization signal data, or a combination of co-polarization and cross-polarization signal data. In the method 900, at least one characteristic of a region of an earth formation 215, 220 may be determined by comparing the signal data with a simulated response library and/or an experimental data library.

The comparison may involve numerical inversion methodologies and/or iterative techniques. One or more computer programs may be used to determine a characteristic of a region of an earth formation 215, 220 using these methodologies and/or techniques.

Figure 12:
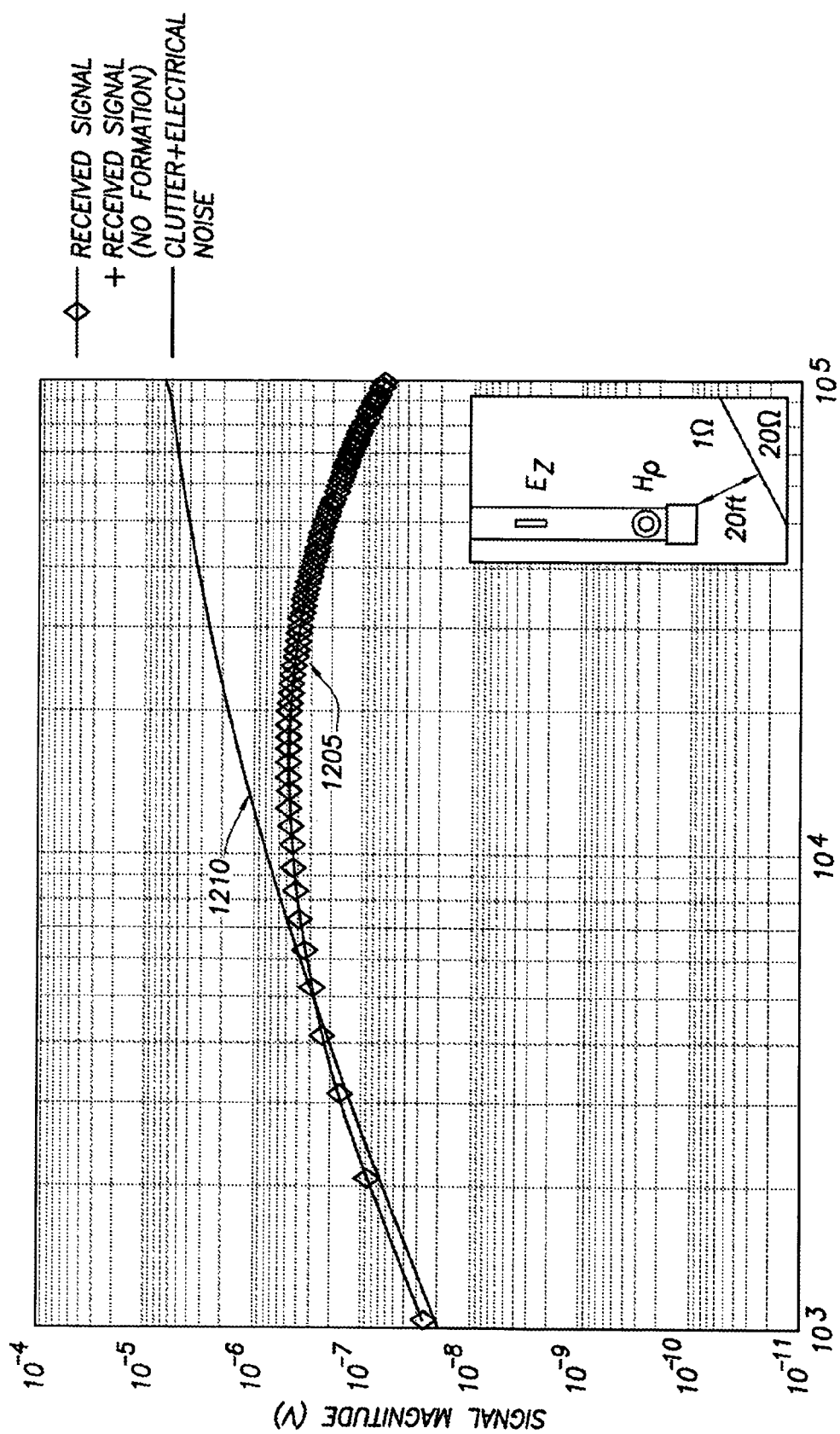
FIGS. 12-14 are plots of signal magnitude versus frequency for various antenna configurations.
Figure 13:
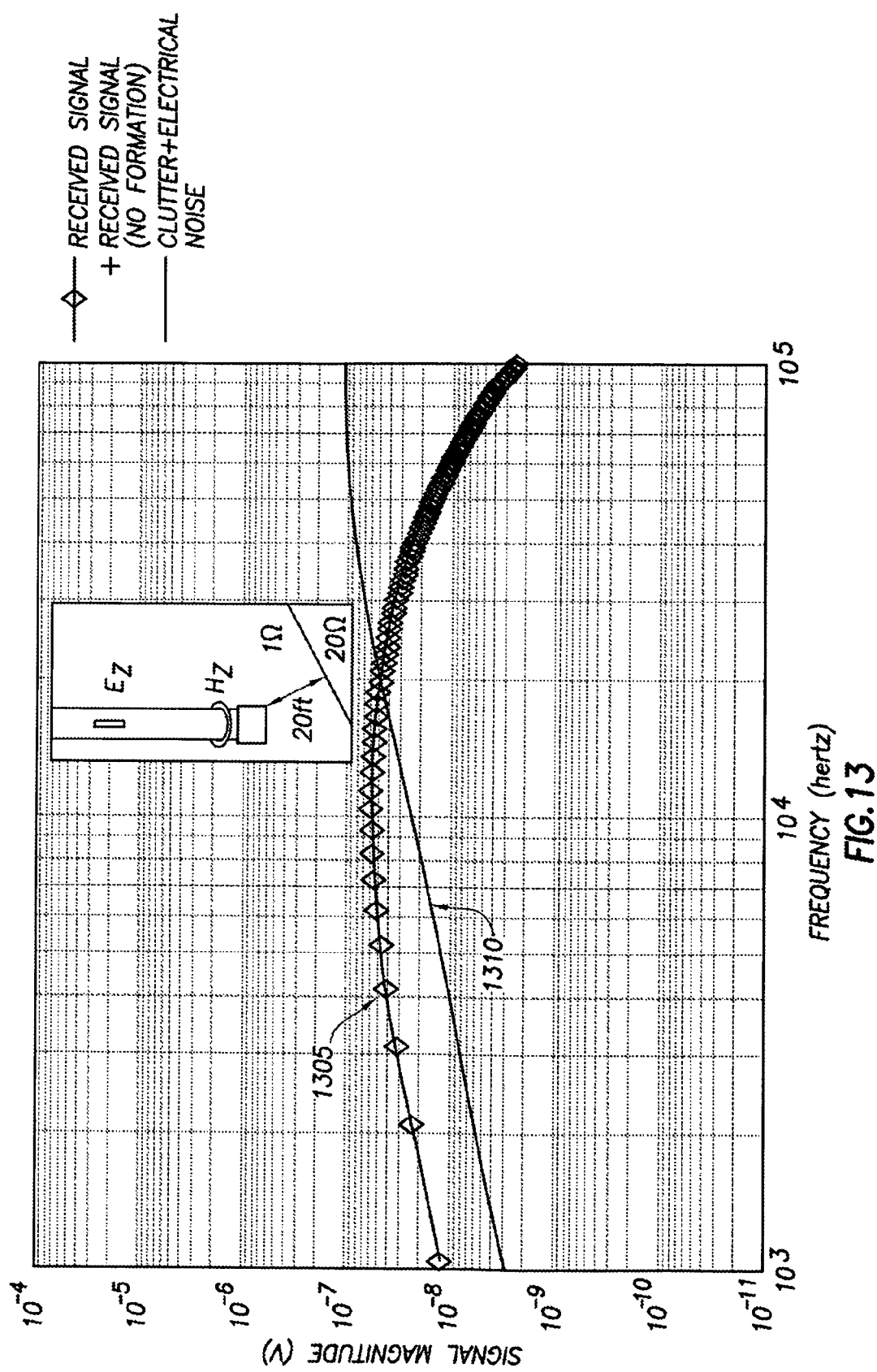
Figure 14:
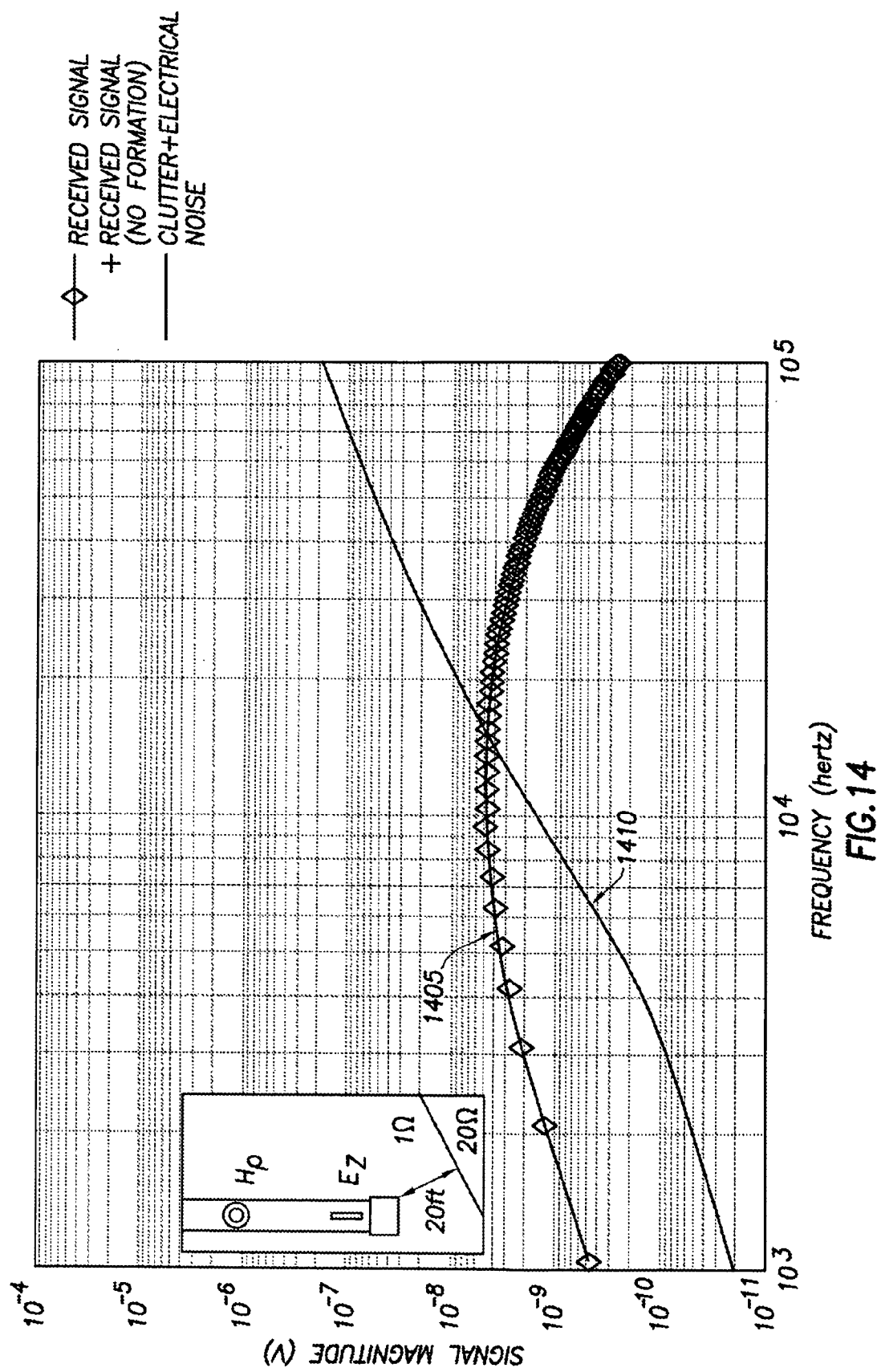

FIGS. 12-14 are example plots of received signal magnitude (V) versus transmit signal frequency (Hz) for various antenna configurations. The input current levels to each of the transmit antennas 105 are normalized so that 200 W is produced at the transmitting antenna terminals.

For each of the plots, there is a dipping bed located 20 feet ahead of the drill bit 210. The dipping bed has a 30-degree dipping angle.

The drill string 200 is in a bed 215 with a resistivity of 1Ω. The dipping bed 220 has a resistivity of 20Ω. The spacing between the transmit antenna 105 and the receive antenna 110 is 296 inches (7.5 meters).

FIG. 12 is for an $E_Z H\rho$ antenna configuration (as shown in FIG. 3). $E_Z$ is a toroidal antenna and $H\rho$ is a coil antenna.

Curve 1205 shows the signal strength in the presence of the dipping bed 220. Curve 1210 represents the level of clutter and electrical noise due to random inhomogeneities in the absence of the dipping bed 220.

A received signal above the curve 1210 indicates detection of the dipping bed 220. In this example, the received signal is above curve 1210 at frequencies below about 5 kHz and the maximum received signal magnitude occurs around 15 kHz.

FIG. 13 is for an $E_Z H_Z$ antenna configuration (as shown in FIG. 5). $E_Z$ is a wire antenna and $H_Z$ is a coil antenna.

Curve 1305 shows the signal strength in the presence of the dipping bed 220. Curve 1310 represents the clutter and electrical noise level in the absence of the dipping bed 220.

A received signal above the curve 1310 indicates detection of the dipping bed 220. In this example, the received signal is above curve 1310 at frequencies below about 20 kHz and the maximum received signal magnitude occurs around 15 kHz.

FIG. 14 is for an $H\rho E_Z$ antenna configuration (as shown in FIG. 4). $H\rho$ is a coil antenna and $E_Z$ is a toroidal antenna.

Curve 1405 shows the signal strength in the presence of the dipping bed 220. Curve 1410 represents the clutter and electrical noise level in the absence of the dipping bed 220.

A received signal above the curve 1410 indicates detection of the dipping bed 220. In this example, the received signal is above curve 1410 at frequencies below about 15 kHz and the maximum received signal magnitude occurs around 15 kHz.

The antenna configurations shown in FIGS. 12-14 only produce a measurable response in the presence of a resistive anomaly. Because the E and H antenna configuration reduces the homogeneous part of the electromagnetic signal, the $E_Z H\rho$, $E_Z H_Z$, and $H\rho E_Z$ antenna configurations do not produce a measurable response when a resistive anomaly is not present. By reducing the homogeneous part of the electromagnetic signal, the E and H antenna configuration increases the depth of detection of the resistive anomaly.

FIGS. 15-18 are plots of signal magnitude (V) versus distance to a formation (ft) for various antenna configurations. The input current levels to each of the transmit antennas are normalized so that 200 W is produced at the transmit antenna terminals.

A 5 kHz signal is transmitted. The dipping bed 220 has a 30-degree dipping angle. The drill string 200 is in a bed 215 with a resistivity of 1Ω. The dipping bed 220 has a resistivity of 20Ω.

Figure 15:
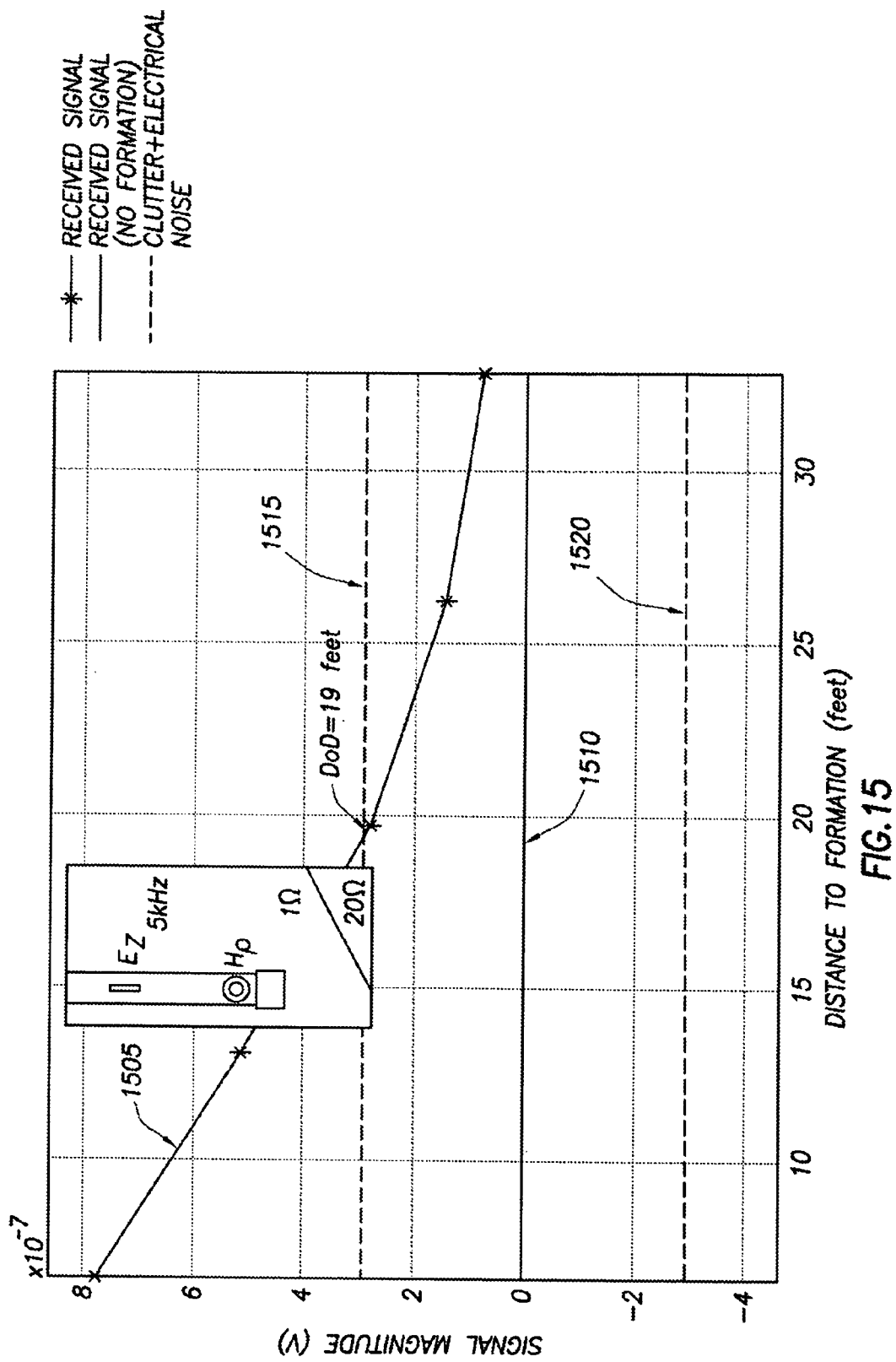
FIGS. 15-18 are plots of signal magnitude versus distance to a formation anomaly for various antenna configurations.

FIG. 15 is for an $E_Z H\rho$ antenna configuration (as shown in FIG. 3). $E_Z$ is a toroidal antenna and $H\rho$ is a coil antenna.

Curve 1505 shows the signal strength in the presence of the formation 220. Curve 1510 represents the antenna response in the absence of the dipping bed 220. Curves 1515 and 1520 are the maximum and minimum threshold levels due to measurement noise.

The depth of detection DoD is the point at which the received signal exceeds the maximum threshold level 1515. In this example, the dipping bed 220 is detected at a distance of approximately 19 feet (5.8 meters).

Figure 16:
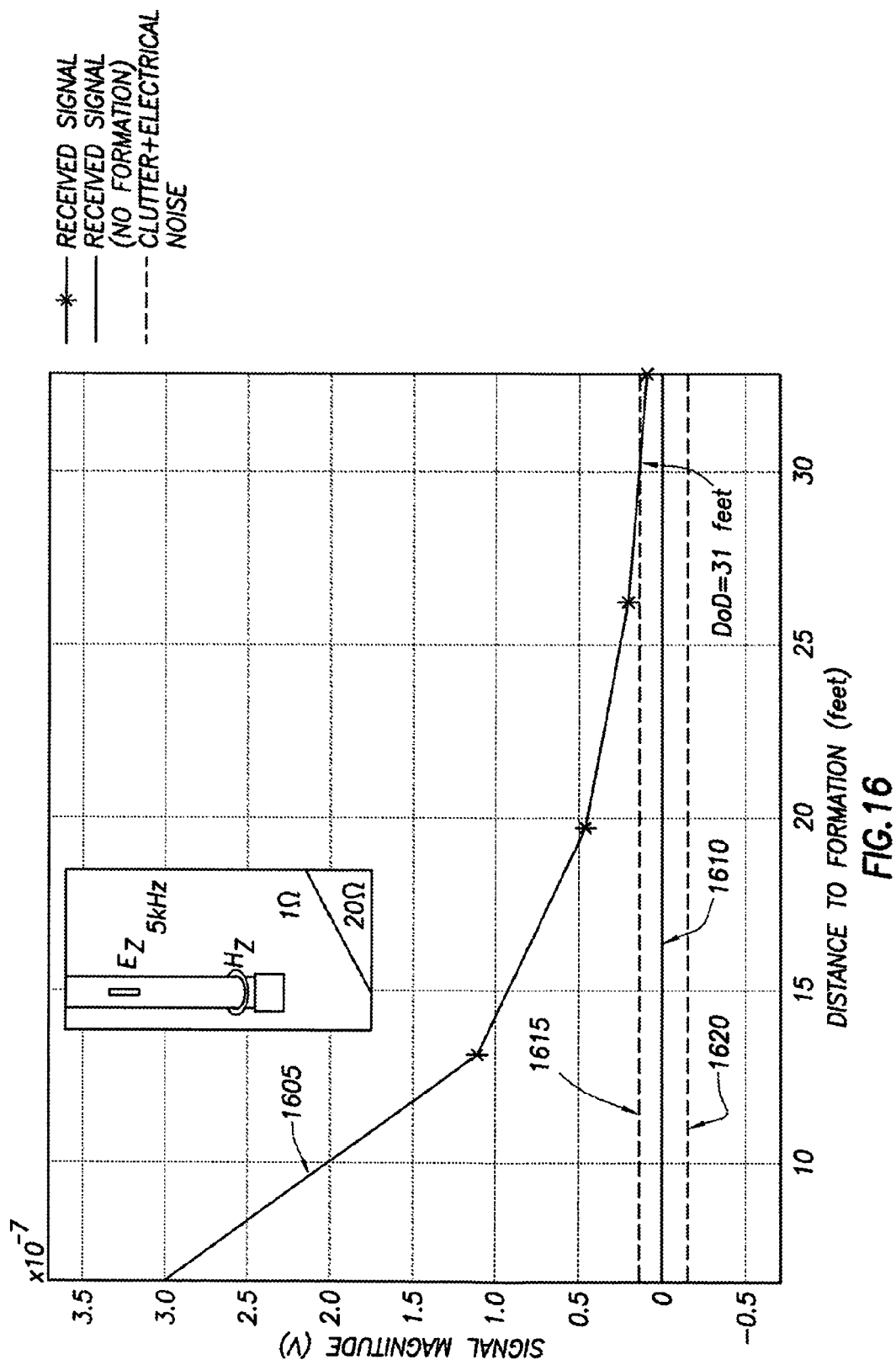

FIG. 16 is for an $E_Z H_Z$ antenna configuration (as shown in FIG. 5). $E_Z$ is a wire antenna and $H_Z$ is a coil antenna.

Curve 1605 shows the signal strength in the presence of the dipping bed 220. Curve 1610 represents the antenna response in the absence of the dipping bed 220. Curves 1615 and 1620 are the maximum and minimum threshold levels due to measurement noise.

The depth of detection DoD is the point at which the received signal exceeds the maximum threshold level 1615. In this example, the dipping bed 220 is detected at a distance of approximately 31 feet (9.4 meters).

Figure 17:
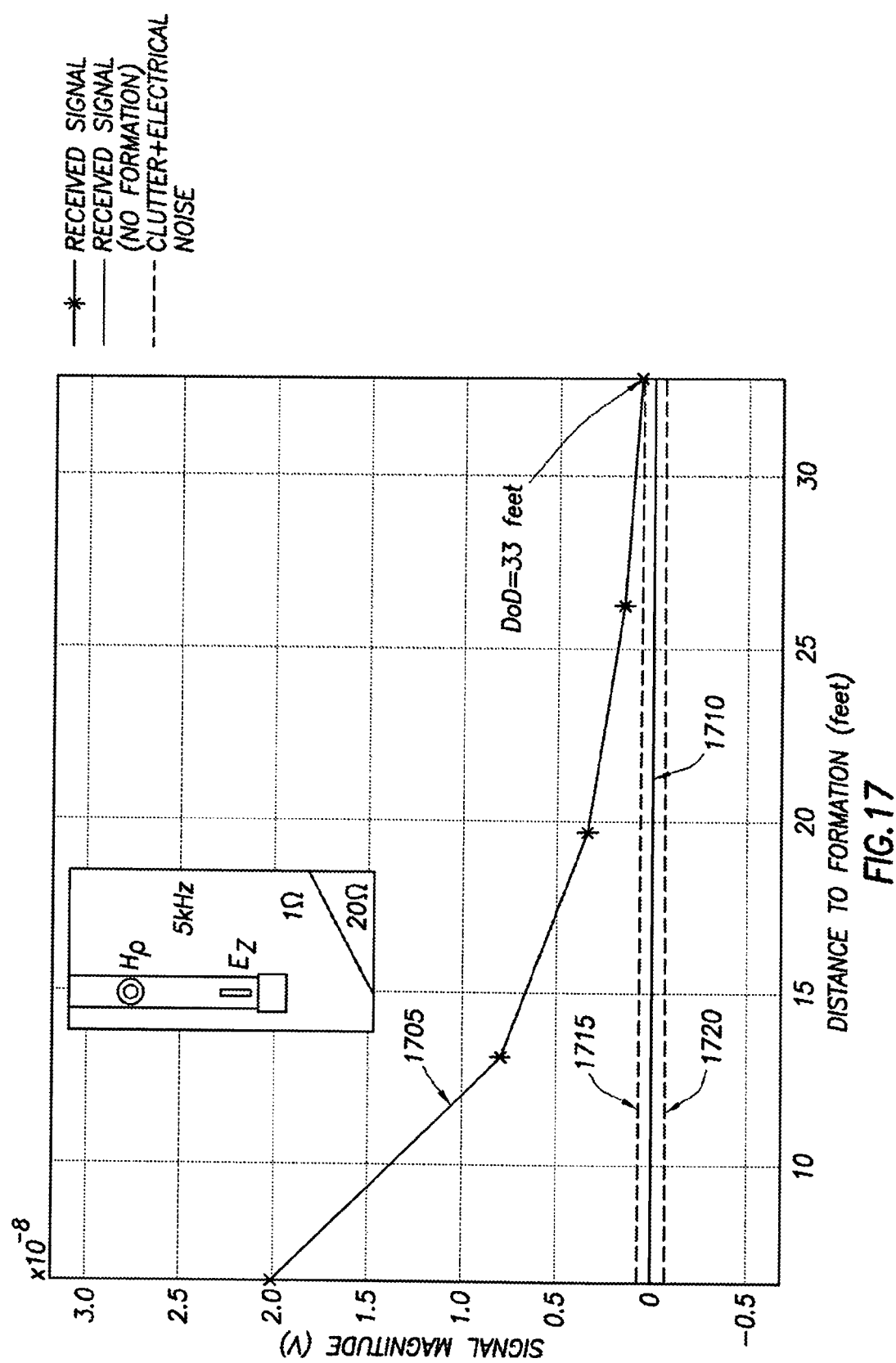

FIG. 17 is for an $H\rho E_Z$ antenna configuration (as shown in FIG. 4). $H\rho$ is a coil antenna and $E_Z$ is a toroidal antenna.

Curve 1705 shows the signal strength in the presence of the dipping bed 220. Curve 1710 represents the antenna response in the absence of the dipping bed 220. Curves 1715 and 1720 are the maximum and minimum threshold levels due to measurement noise.

The depth of detection DoD is the point at which the received signal exceeds the maximum threshold level 1715. In this example, the dipping bed 220 is detected at a distance of approximately 33 feet (10 meters).

Figure 18:
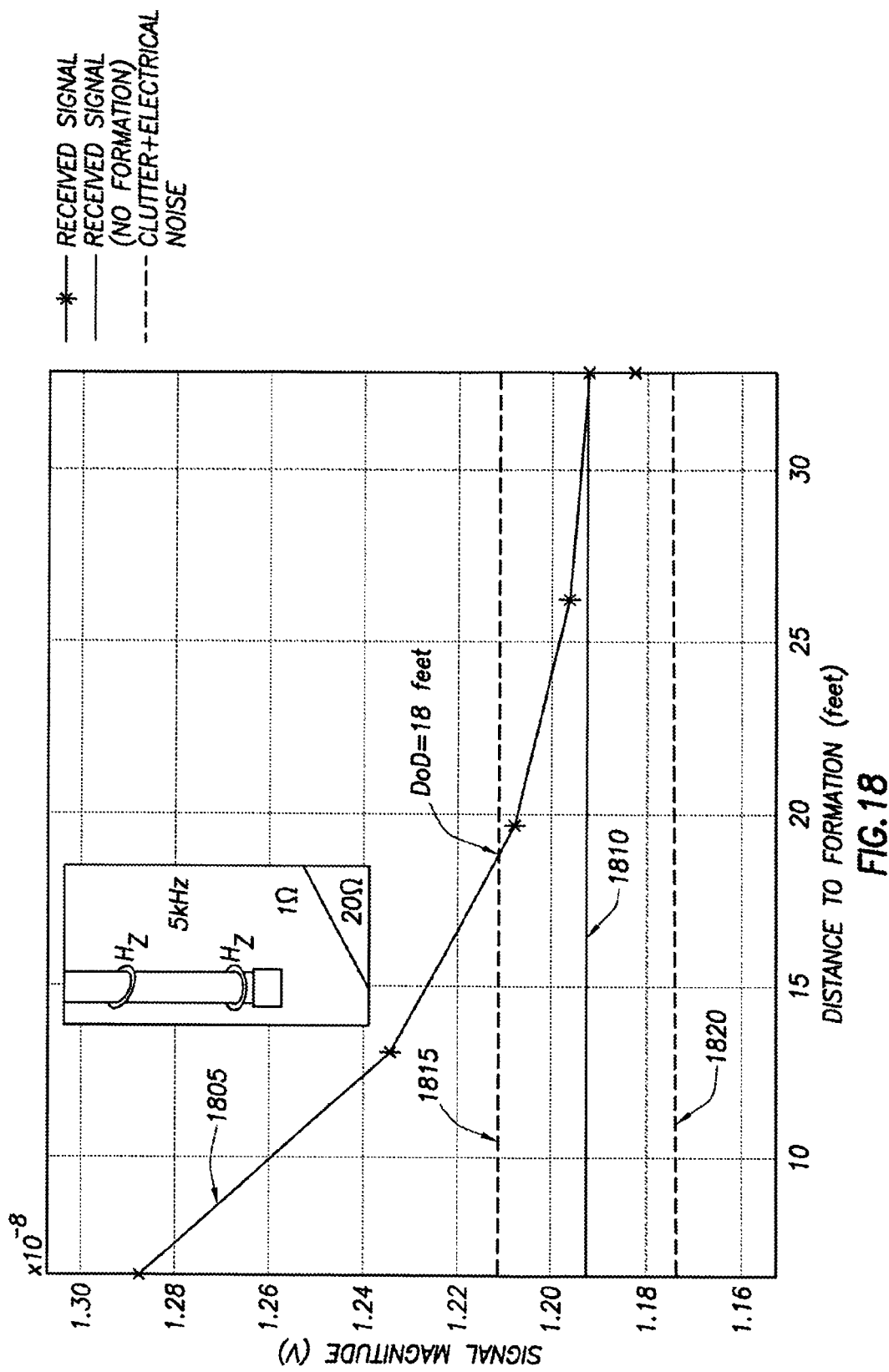

FIG. 18 is for an $H_Z H_Z$ antenna configuration. Both of the Hz antennas are coil antennas. However, the $H_Z$ transmit antenna coil is tilted.

Curve 1805 shows the signal strength in the presence of the dipping bed 220. Curve 1810 represents the antenna response in the absence of the dipping bed 220.

Unlike the antenna configurations of FIGS. 15-17, the $H_Z H_Z$ antenna configuration produces a baseline response level even when a resistive anomaly is not present. Curves 1815 and 1820 are the maximum and minimum threshold levels due to measurement noise.

The depth of detection DoD is the point at which the received signal exceeds the maximum threshold level 1815. In this example, the dipping bed is detected at a distance of approximately 18 feet (5.5 meters).

Figure 19:
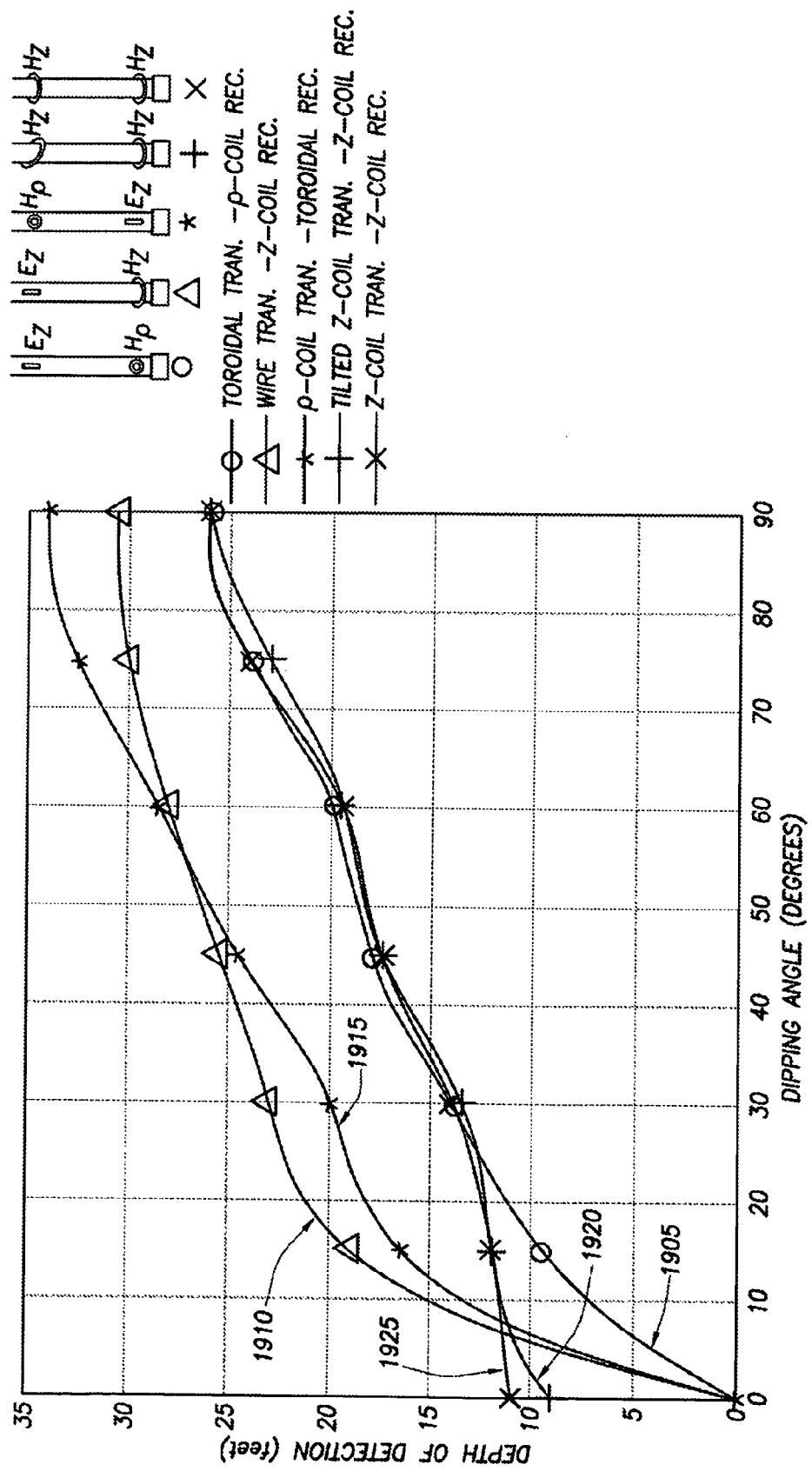
FIG. 19 is a plot of depth of detection versus dipping angle for various antenna configurations.

FIG. 19 is a plot of the depth of detection (ft) versus the dipping angle (degrees) for various antenna configurations. The transmit frequency is 15 kHz and the formation 215 has a resistivity ($R_1$) value of 1Ω. The dipping bed 220 has a resistivity value of 20Ω.

Curve 1905 is for an $E_Z H\rho$ antenna configuration. Curve 1910 is for an $E_Z H_Z$ antenna configuration. Curve 1915 is for an $H\rho E_Z$ antenna configuration. Curve 1920 is for an $H_Z H_Z$ antenna configuration, with a tilted $H_Z$ transmit antenna. Curve 1925 is for an $H_Z H_Z$ antenna configuration.

For all configurations, depth of detection increases with dipping angle. However, cross-polarization configurations can read approximately 10 feet (3.0 meters) deeper than co-polarization configurations, provided that a small dipping angle (θ>10 degrees) exists. Due to field cancellations associated with symmetry, no bed detection is made in the case of a 0 degree dipping angle for cross-polarization configurations.

FIG. 19 shows that an antenna arrangement, which includes both cross-polarization and co-polarization effects, can detect a bed at a distance of 10 to 35 feet (3.0 to 10.7 meters), when the bed has a dipping angle between 0 to 90 degrees.

Figure 20A:
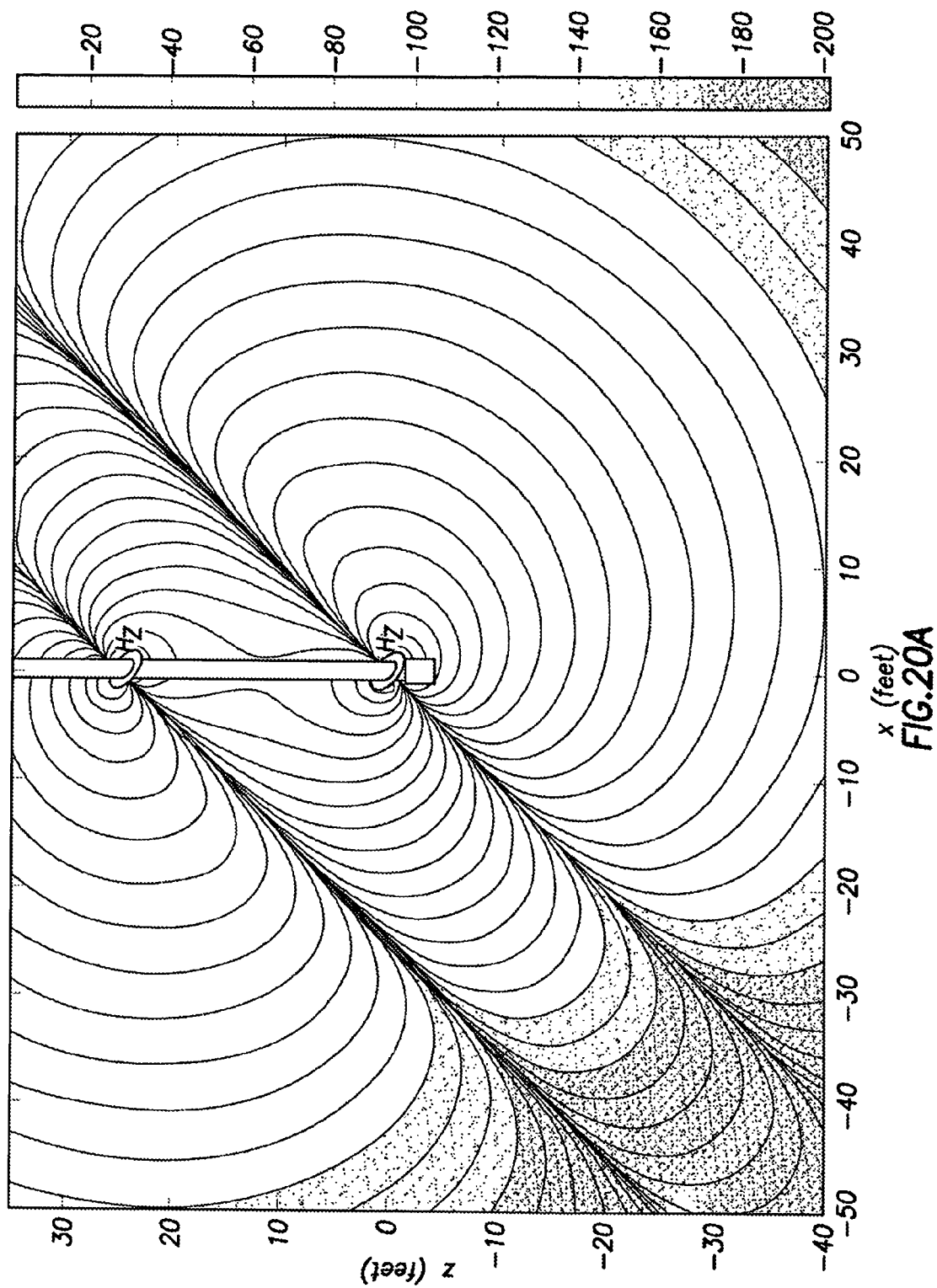

FIGS. 20A and 20B show example detection sensitivity patterns for two different antenna configurations. FIG. 20A shows the detection sensitivity pattern for an $H_Z H_Z$ antenna configuration, where both of the $H_Z$ coil antennas are tilted in the same direction. FIG. 20B shows the detection sensitivity pattern for a drill string 200 which includes two $E_Y$ wire antennas and a single tilted $H_Z$ coil antenna. Both figures show how tilting the $H_Z$ coil antennas repositions the blind area(s) caused by the electromagnetic signal pattern away from the region of the formation directly ahead of the drill string 200.

FIGS. 21-24 are schematic diagrams of generic tool configurations. As previously discussed, the relative positions of the transmit and receive antennas in any of the configurations may be reversed if desired.

Figure 21:
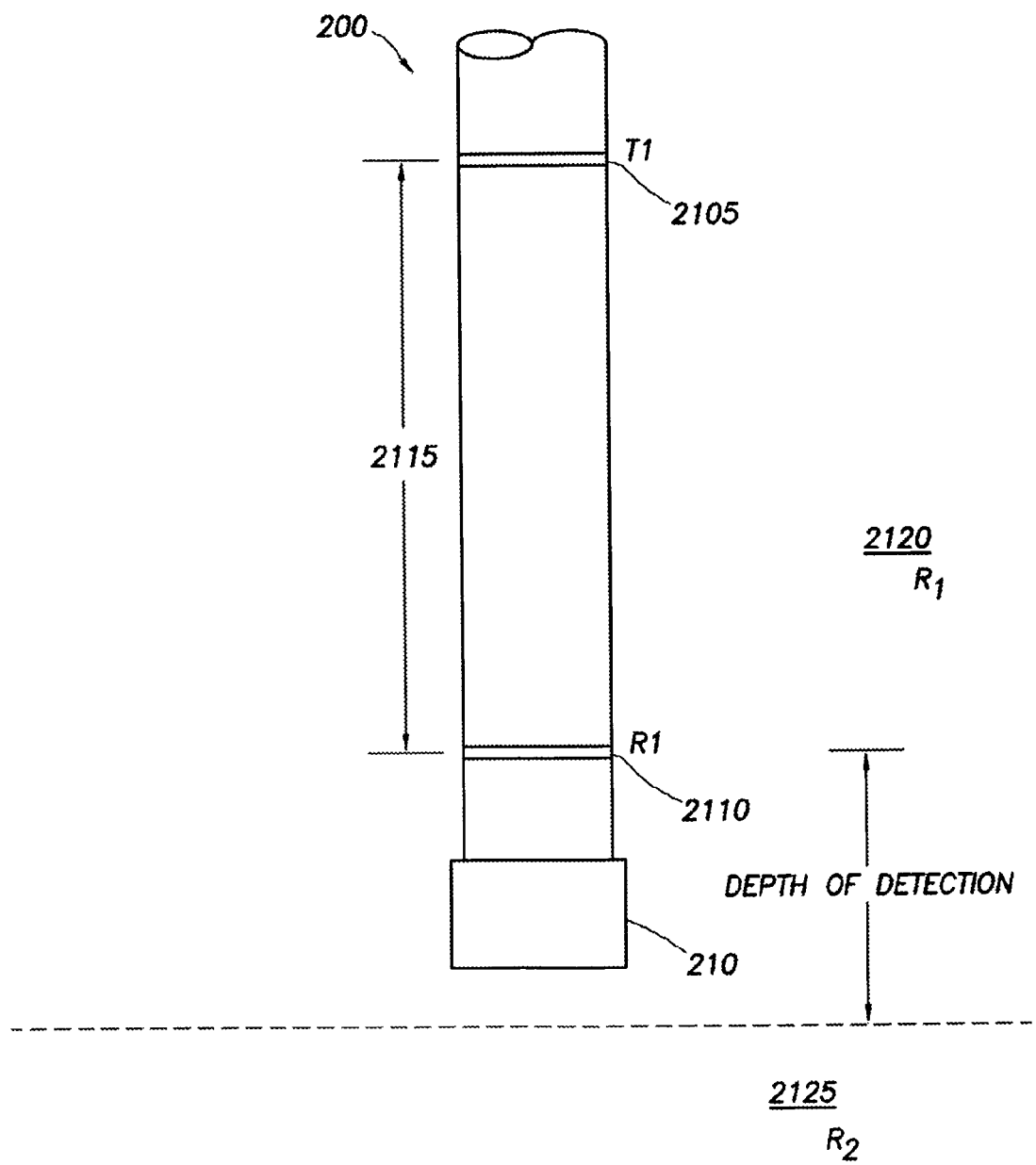

FIG. 21 shows a drill string 200 which includes a single transmit antenna 2105, a single receive antenna 2110, and drill bit 210. The transmit antenna 2105 is separated from the receive antenna 2110 by a distance 2115. For example, the distance 2115 may be 296 inches (7.5 meters). This configuration is referred to as T1R1.

The drill string 200 is in a bed 2120 which has a resistivity value of $R_1$. The receive antenna 2110 is located a certain distance from a boundary to a second bed 2125, which has a resistivity value of $R_2$. The distance at which the receive antenna 2110 is first able to detect the bed 2125 is the depth of detection.

FIG. 22 shows a drill string 200 which includes two transmit antennas (2105 and 2205) and a single receive antenna

2110. The transmit antenna 2105 and the receive antenna 2110 are separated by a distance 2115. For example, the distance 2115 may be 296 inches (7.5 meters). Transmit antenna 2105 and transmit antenna 2205 are separated by a distance 2220.

For example, the distance 2220 may be 16 inches (0.4 meter). This configuration is referred to as T1/T2 16". In another example, the distance 2220 may be 24 inches (0.6 meter). This configuration is referred to as T1/T2 24". In another example, the distance 2220 may be 32 inches (0.8 meter). This configuration is referred to as T1/T2 32". Signal data from this antenna arrangement may be processed as T1R1/T2R1.

Note that it is not necessary for the transmit antennas 2105 and 2205 to be positioned adjacent to each other on the drill string 200 as shown in FIG. 22. For example, the receive antenna 2110 may be positioned between transmit antenna 2105 and transmit antenna 2205. The spacing between antennas may be symmetrical or asymmetrical.

In this case, the difference between T1R1 and T2R1 may be used as a reference measurement to cancel fields that are not associated with the region of interest. The sum of T1R1 and T2R1 may be used to produce a symmetrical tool response.

FIG. 23 shows a drill string 200 which includes a single transmit antenna 2105 and two receive antennas (2110 and 2310). The transmit antenna 2105 and the receive antenna 2310 are separated by a distance 2315. For example, the distance 2315 may be 296 inches (7.5 meters). Receive antenna 2110 and receive antenna 2310 are separated by a distance 2320.

For example, the distance 2320 may be 8 inches (0.2 meter). This configuration is referred to as R1/R2 8". In another example, the distance 2320 may be 24 inches (0.6 meter). This configuration is referred to as R1/R2 24". In another example, the distance 2320 may be 40 inches (1.0 meter). This configuration is referred to as R1/R2 40". Signal data from this antenna arrangement may be processed as T1R1/T1R2.

Note that it is not necessary for the receive antennas 2110 and 2310 to be positioned adjacent to each other on the drill string 200 as shown in FIG. 23. For example, the transmit antenna 2105 may be positioned between receive antenna 2110 and receive antenna 2310. The spacing between antennas may be symmetrical or asymmetrical.

Figure 24:
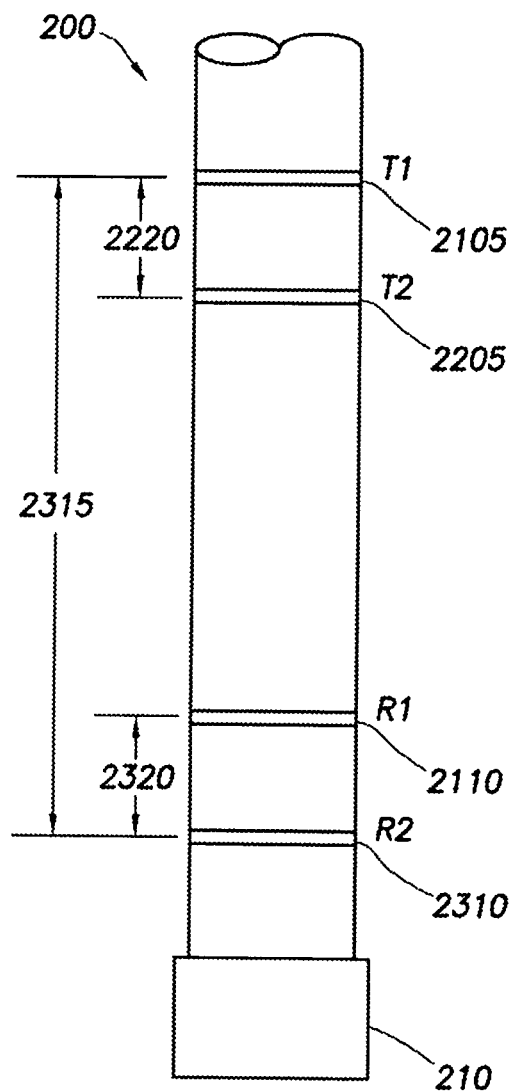

FIG. 24 shows a drill string 200, which includes two transmit antennas (2105 and 2205) and two receive antennas (2110 and 2310). The transmit antenna 2105 and the receive antenna 2310 are separated by a distance 2315. For example, distance 2115 may be 296 inches (7.5 meters). Transmit antenna 2105 and transmit antenna 2205 are separated by a distance 2220. Receive antenna 2110 and receive antenna 2310 are separated by a distance 2320.

For example, the distance 2220 and the distance 2320 may both be 8 inches (0.2 meter). This configuration is referred to as Pr 8". In another example, the distance 2220 and the distance 2320 may both be 16 inches (0.4 meter). This configuration is referred to as Pr 16".

Note that it is not necessary for the distance 2220 and the distance 2320 to always be the same. However, if the distances 2220 and 2320 are the same, a T1R1 configuration can synthesize a Pr configuration by buffering signal data and comparing the received signals at different times as the drill string 200 advances during the drilling process. Signal data from this antenna arrangement may be processed as T1R1/T2R2.

Note that it is not necessary for transmit antennas 2105 and 2205 and receive antennas 2110 and 2310 to be positioned as shown in FIG. 24. For example, receive antennas 2110 and 2310 may be positioned between transmit antenna 2105 and transmit antenna 2205.

Signal data from this antenna arrangement may be processed as (T1R1×T2R2)/(T1R2/T2R1). This antenna arrangement automatically compensates for system variations, such as thermal expansion, and thereby permits stable measurements using a non-calibrated tool.

Still referring to FIG. 24, transmit antennas 2105 and 2205 may also be positioned between receive antenna 2110 and receive antenna 2310. Additionally, transmit and receive antennas may be alternately positioned on the drill string 200. Any relative positioning of the transmit and receive antennas may be used in keeping with this disclosure.

Figure 25:
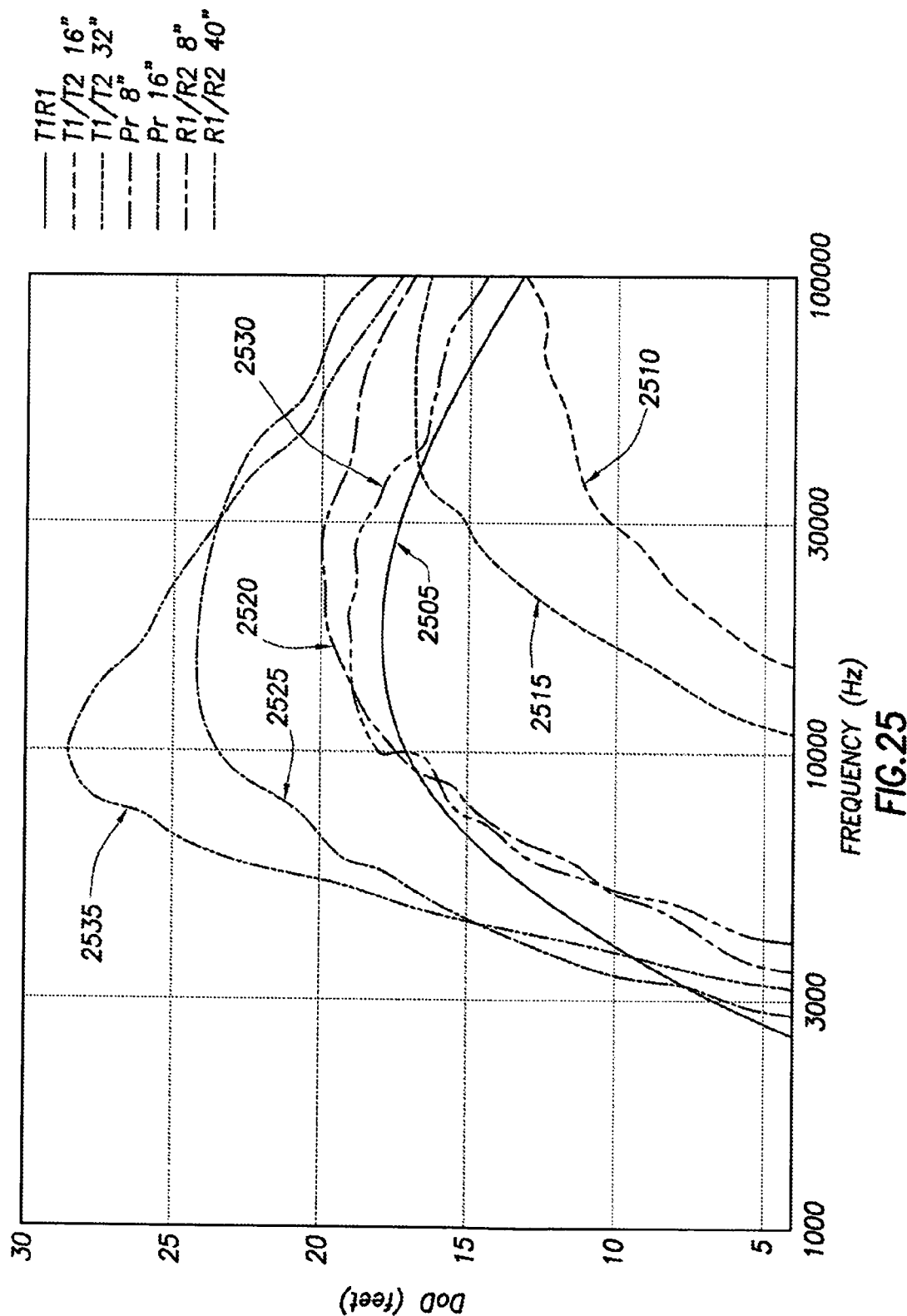
FIGS. 25-26 are plots of depth of detection versus frequency for various antenna configurations.

FIG. 25 is a plot of the depth of detection (measured from the antenna that is closest to the drill bit 210, as shown in FIG. 21) versus frequency for various antenna configurations where $R_1=20\Omega$ and $R_2=1\Omega$. For this evaluation, all of the configurations used $H_Z$ coil antennas.

Curve 2505 represents T1R1, curve 2510 represents T1/T2 16", curve 2515 represents T1/T2 32", curve 2520 represents Pr 8", curve 2525 represents Pr 16", curve 2530 represents R1/R2 8", and curve 2535 represents R1/R2 40". The largest depth of detection (approximately 28 feet or 8.5 meters) was obtained at 10 kHz with the R1/R2 40" configuration. The Pr 8" and Pr 16" configurations produced depths of detection of approximately 20 and 24 feet (6.1 and 7.3 meters) at 25 kHz and 20 kHz, respectively.

Figure 26:
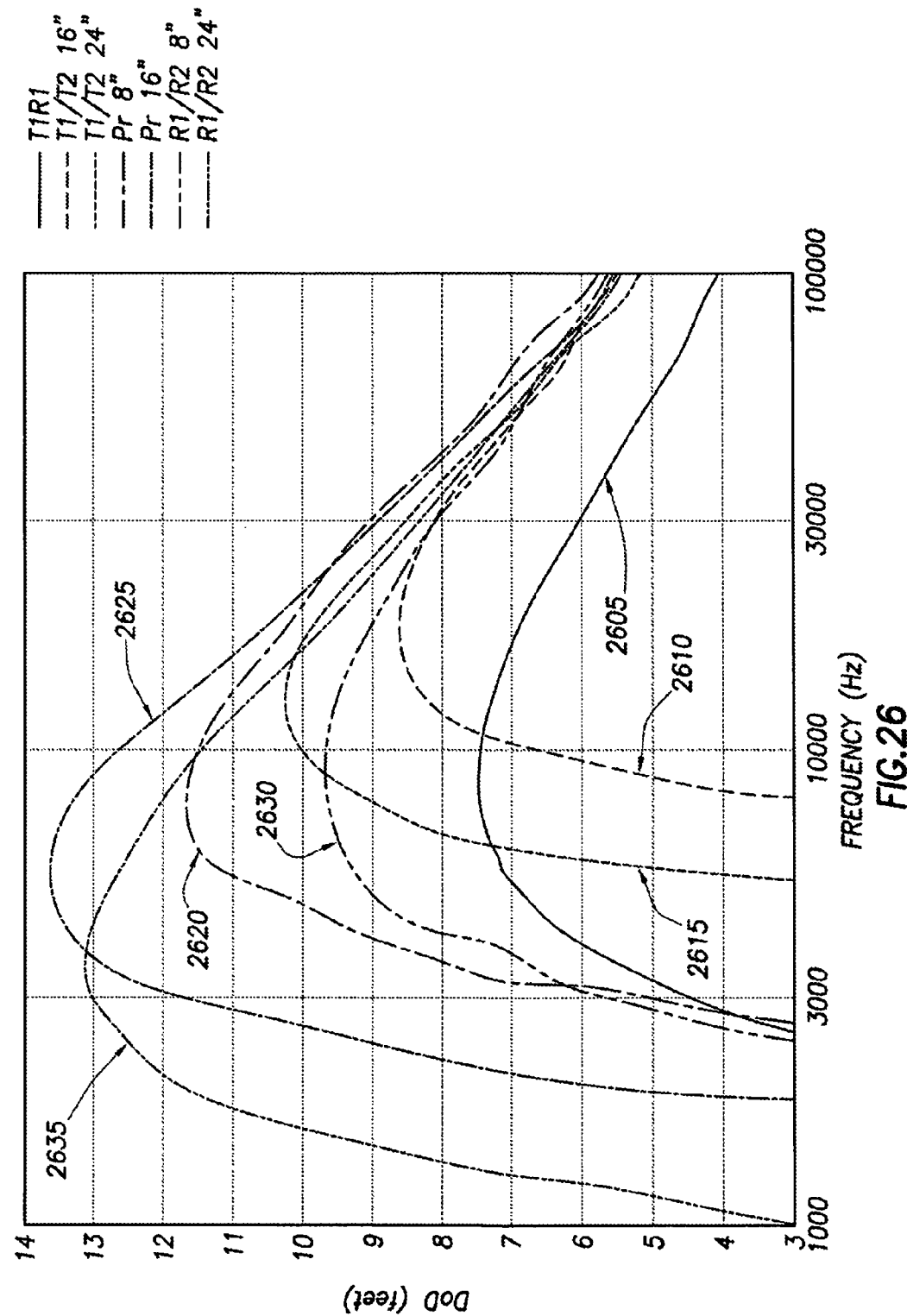

FIG. 26 shows a similar plot of the depth of detection versus frequency for various antenna configurations where $R_1=1\Omega$ and $R_2=20\Omega$. For this evaluation, all of the configurations used $H_Z$ coil antennas.

Curve 2605 represents T1R1, curve 2610 represents T1/T2 16", curve 2615 represents T1/T2 24", curve 2620 represents Pr 8", curve 2625 represents Pr 16", curve 2630 represents R1/R2 8", and curve 2635 represents R1/R2 24". The Pr 16" antenna configuration produced the highest depth of detection (just under 14 feet or 4.3 meters) at approximately 5 kHz. The R1/R2 24" configuration provided a depth of detection of approximately 13 feet (4.0 meters) at around 3 kHz.

Figure 27:
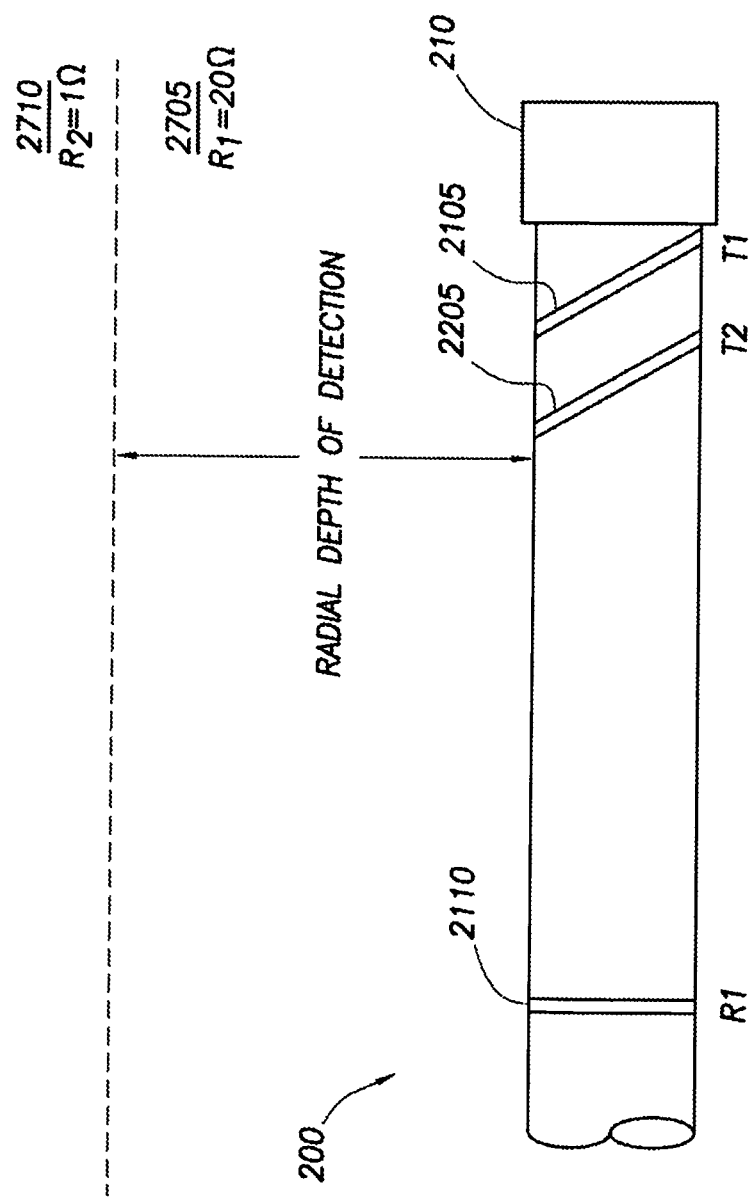
FIG. 27 is a schematic diagram of an example downhole sensing tool, which is running parallel to an adjacent bed boundary.

In addition to sensing ahead of the bit, various antenna configurations may also be sensitive to formation anomalies located in a radial direction relative to the drill string 200. FIG. 27 is a schematic drawing showing a T1/T2 configuration in a bed 2705.

The bed 2705 has a resistivity of 20Ω. Running parallel to the drill string 200 is an adjacent formation 2710. The adjacent formation 2710 has a resistivity of 1Ω.

Figure 28:
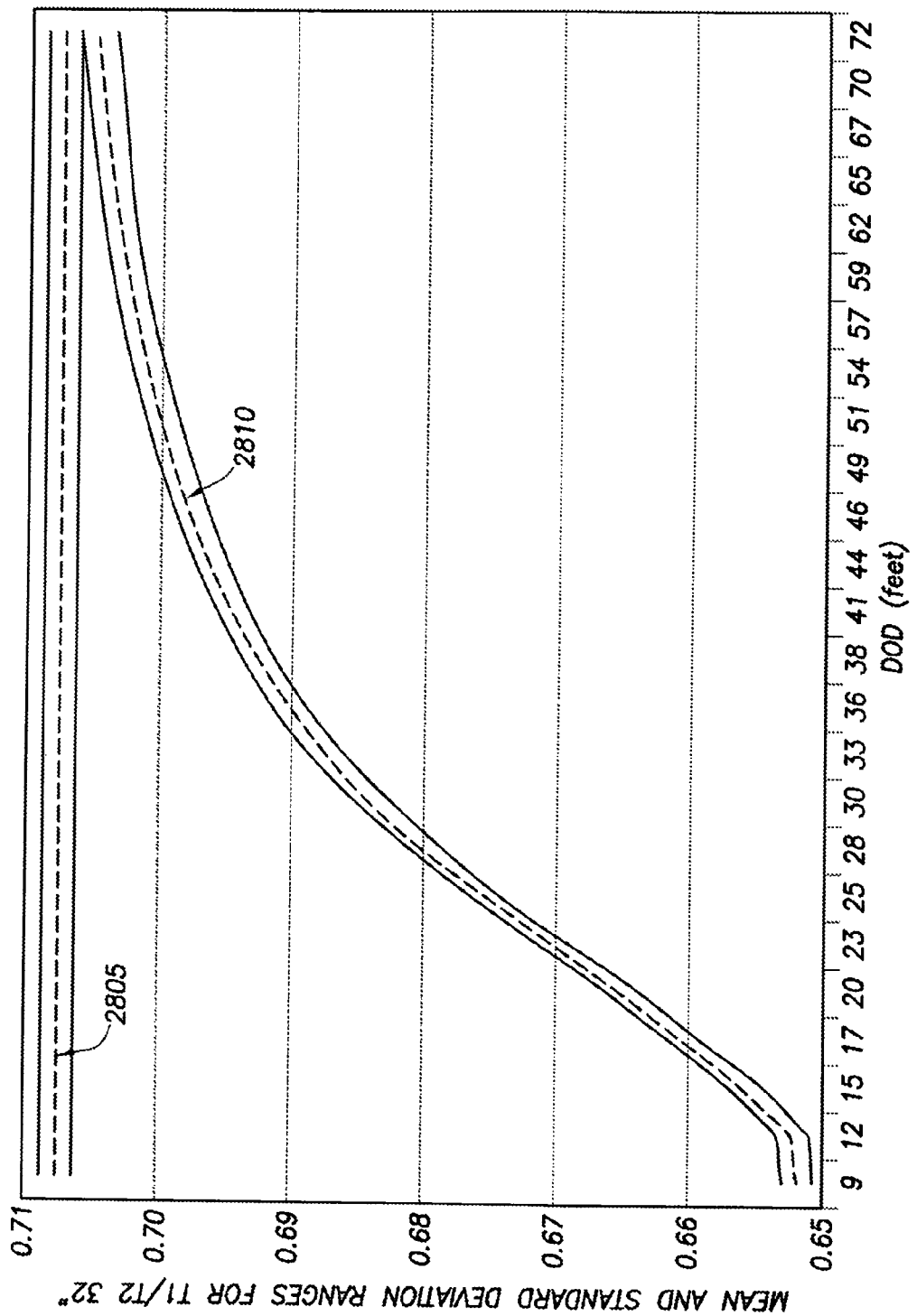
FIG. 28 is a plot of mean and standard deviation of amplitude response versus radial distance to an adjacent bed.

FIG. 28 is a plot of the received signal amplitude versus the radial distance to the adjacent formation for the example of FIG. 27. Line 2805 is the received signal for the case where an adjacent formation is not present.

Curve 2810 is the received signal for the case where an adjacent formation is present. Both lines are bounded by minimum and maximum values associated with a 2% noise threshold.

In this example, a T1/T2 32" configuration was used with two tilted $H_Z$ transmit antennas and an $H_Z$ receive antenna (as shown in FIG. 27). The transmitter signal frequency was 9 kHz. Curve 2810 diverts from line 2805 at approximately 72 feet (21.9 meters), indicating a radial depth of detection of approximately 72 feet (21.9 meters) with this tool configuration.

As previously discussed, the method 800 may determine at least one characteristic of a region of an earth formation 215, 220. The characteristic may be formation resistivity. Other characteristics may include formation conductivity, pore pressure, porosity, and permeability.

Figure 29:
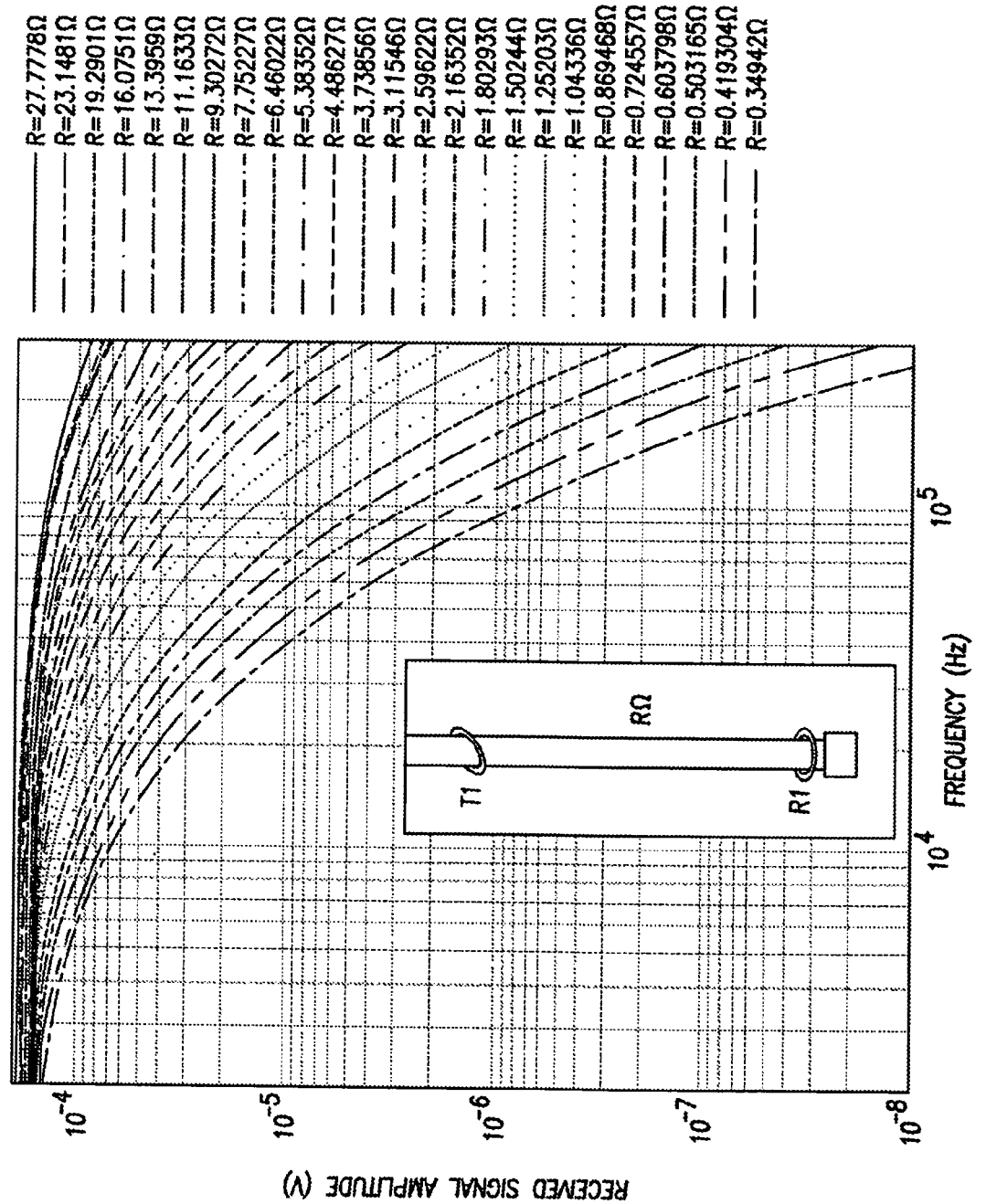
FIG. 29 is a plot of a received signal amplitude versus frequency for example formation resistivity values.

FIG. 29 is a representative plot of received signal amplitude (V) versus frequency (Hz) for different formation resistivity values. FIG. 29 is for a tool configuration having a single tilted $H_Z$ transmit antenna and a single $H_Z$ receive antenna. The resistivity values range from 27.77778Ω, which corresponds to the highest and right-most curve, to 0.34942Ω, which corresponds to the lowest and left-most curve. The intermediate curves correspond to the resistivity values listed in the chart.

For this antenna configuration, the received signal amplitude can be correlated to formation resistivity at frequencies above 10 kHz. At frequencies below 10 kHz, direct fields dominate and resistivity measurement accuracy is decreased.

Figure 30:
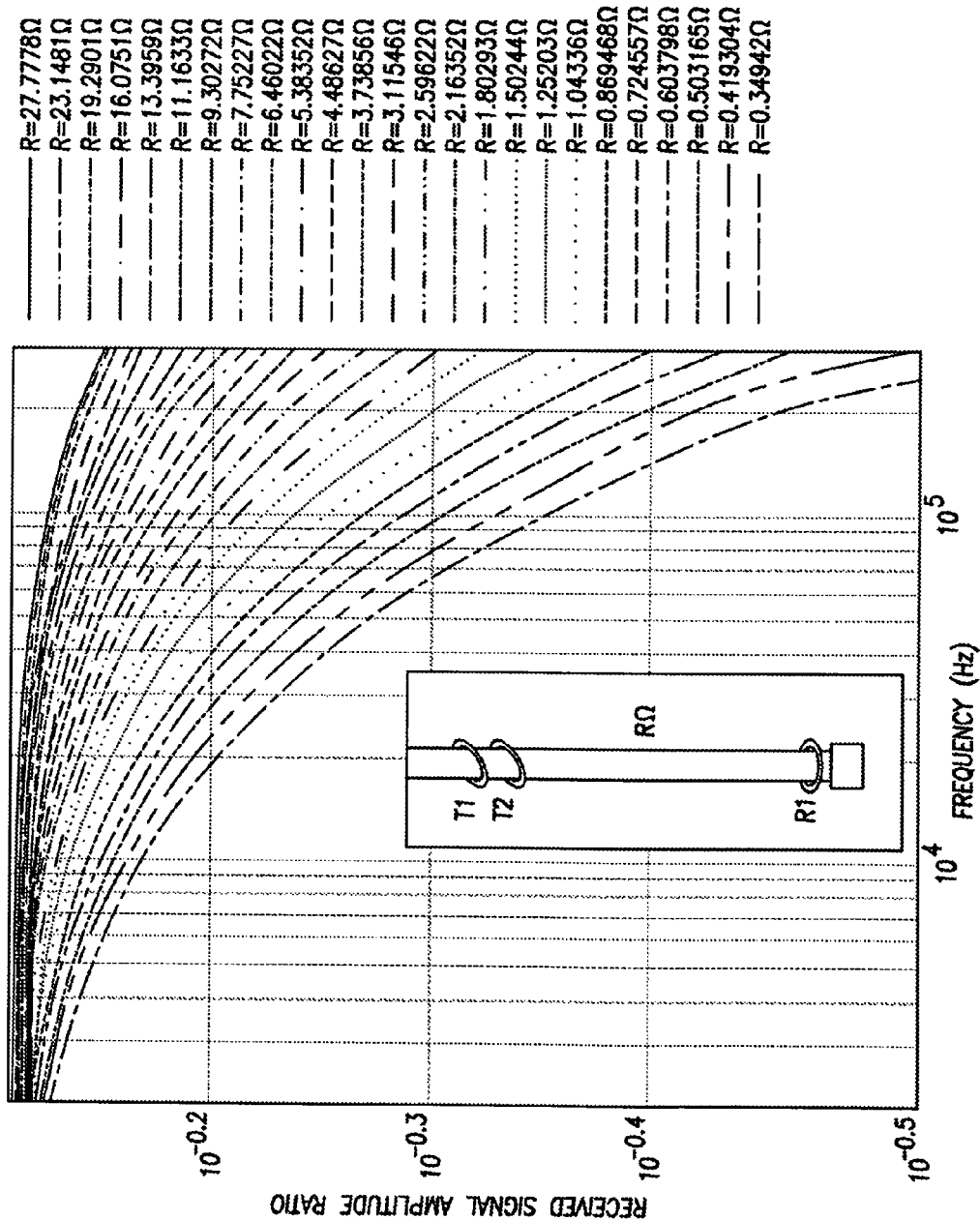
FIG. 30 is a plot of a received signal amplitude ratio versus frequency for example formation resistivity values.

FIG. 30 is a representative plot of a received signal amplitude ratio versus frequency (Hz) for different formation resistivity values. FIG. 30 is for a tool configuration having two tilted $H_Z$ transmit antennas and a single $H_Z$ receive antenna. A dimensionless ratio of the received signal amplitudes from each transmit/receive antenna pair is plotted versus frequency.

For this antenna configuration, the received signal amplitude ratio can be correlated to formation resistivity at frequencies above 10 kHz. At frequencies below 10 kHz, direct fields dominate and resistivity measurement accuracy is decreased.

Because the system 100 is designed for use while drilling, the drill string 200 is surrounded by drilling mud while operating. Some drilling muds may be water-based and other drilling muds may be oil-based.

Figure 31:
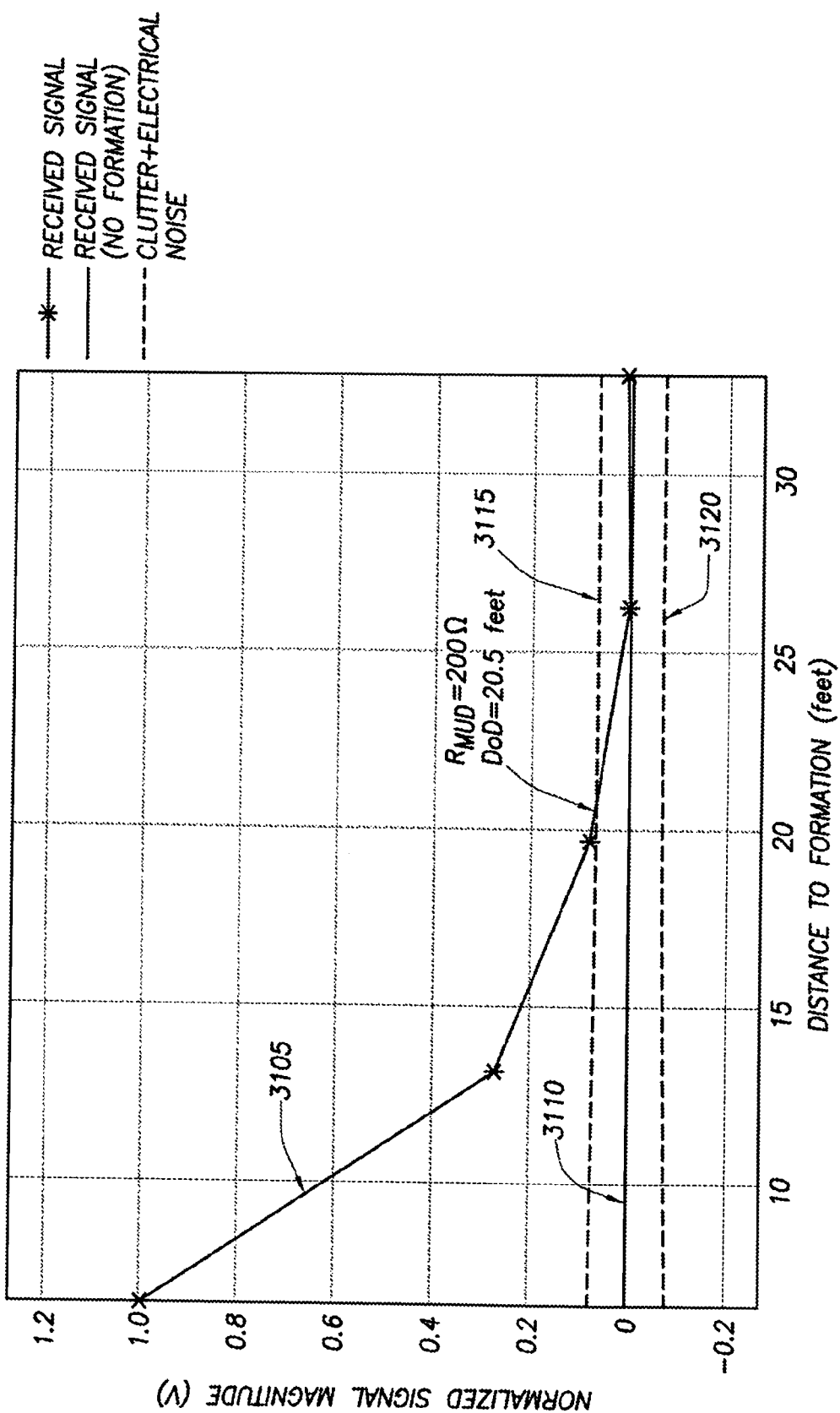
FIGS. 31-33 are plots of normalized signal magnitude versus distance to a formation for various mud resistivities.
Figure 32:
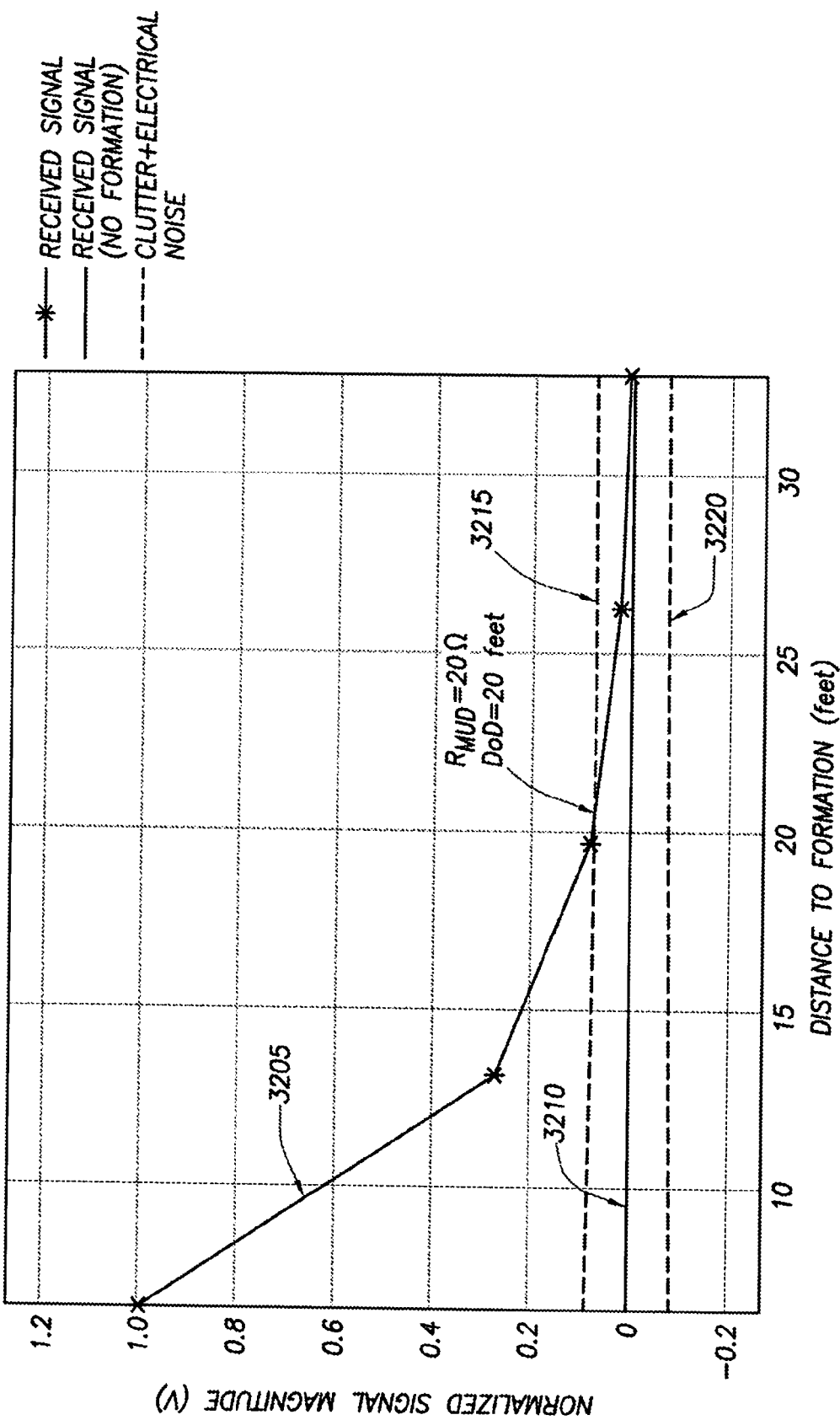
Figure 33:
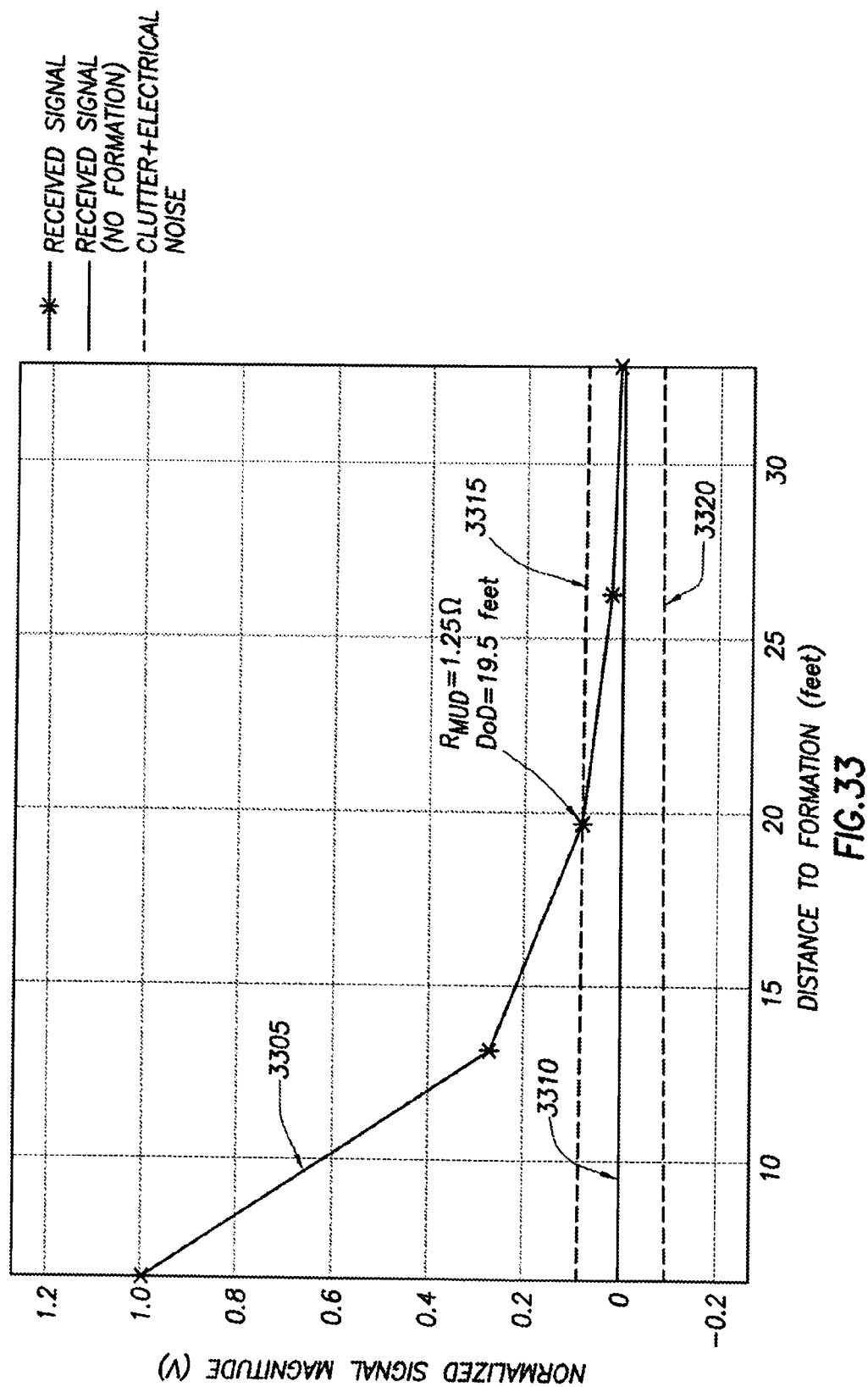

These different drilling muds have different resistivities. FIGS. 31-33 are representative plots of normalized signal magnitudes (V) versus distance to formation (ft) for an $H\rho E_Z$ antenna configuration operating in various mud resistivities.

FIG. 31 is for a mud resistivity of 200Ω. Curve 3105 is a plot of the signal received as the drill string 200 approaches a dipping formation, curve 3110 is a plot of the received signal in the absence of a formation, and curves 3115 and 3120 are the upper and lower detection thresholds.

The depth of detection DoD is the point at which the received signal 3105 exceeds the upper detection threshold 3115. As shown on the plot, the depth of detection for this mud resistivity is about 20.5 feet (6.2 meters).

FIG. 32 is for a mud resistivity of 20Ω. Curve 3205 is a plot of the signal received as the drill string 200 approaches a dipping formation, curve 3210 is a plot of the received signal in the absence of a formation, and curves 3215 and 3220 are the upper and lower detection thresholds.

The depth of detection is the point at which the received signal 3205 exceeds the upper detection threshold 3215. As shown on the plot, the depth of detection for this mud resistivity is about 20 feet (6.1 meters).

FIG. 33 is for a mud resistivity of 1.25Ω. Curve 3305 is a plot of the signal received as the drill string 200 approaches a dipping formation, curve 3310 is a plot of the received signal in the absence of a formation, and curves 3315 and 3320 are the upper and lower detection thresholds.

The depth of detection is the point at which the received signal 3305 exceeds the upper detection threshold 3315. As shown on the plot, the depth of detection for this mud resistivity is about 19.5 feet (5.9 meters).

FIGS. 31-33 show that the detection capability of the system 100 is relatively unaffected by changes in the resistivity of the drilling mud.

It may now be fully appreciated that the above disclosure provides many advancements to the art of downhole sensing. The systems and methods described above permit the determination of at least one characteristic of a region of an earth formation 215, 220 located ahead of the drill string 200 and/or radially outward from the drill string 200.

In particular, the above disclosure provides a downhole sensing system 100 for use while drilling a wellbore 207 with a drill string 200. The system 100 can include a transmit antenna 105 which transmits an electromagnetic signal into a region of an earth formation 215, 220, and a receive antenna 110 which receives the electromagnetic signal from the region of the earth formation 215, 220. At least one characteristic of the region of the earth formation 215, 220 is determined, based at least partially on the signal received by the receive antenna 110. The transmit antenna 105 comprises one of a magnetic dipole and an electric dipole, and the receive antenna comprises the other of the magnetic dipole and the electric dipole.

The region of the earth formation 215, 220 may be located along an intended trajectory 212 of the drill string 200 and/or the region of the earth formation 215, 220 may be located radially outward from the drill string 200.

The magnetic dipole may comprise at least one of a coil antenna, a solenoid antenna, and a magnetometer. The electric dipole may comprise at least one of a wire antenna, a toroidal antenna, a button electrode, and a ring electrode.

The characteristic of the region of the earth formation 215, 220 may include at least one of a formation resistivity, a location of a formation anomaly, a geometry of the formation anomaly, a resistivity of the formation anomaly, a location of a formation boundary, a dipping orientation of the formation boundary, a dipping angle of the formation boundary, and a resistivity of a bed adjacent to the formation boundary.

The characteristic of the region of the earth formation 215, 220 may be based at least partially on a first signal received at a first time, a second signal received at a second time, and a distance traveled by the drill string 200 between the first and the second times.

Also provided by the above disclosure is a method 800 of drilling a wellbore 207 using a drill string 200. The method 800 can include transmitting via a transmit antenna 105 an electromagnetic signal into a region of an earth formation 215, 220; receiving via a receive antenna 110 the electromagnetic signal from the region of the earth formation 215, 220; and determining a characteristic of the region of the earth formation 215, 220, based at least partially on the signal received via the receive antenna 110. The transmit antenna 105 may comprise one of a magnetic dipole and an electric dipole, and the receive antenna 110 may comprise the other of the magnetic dipole and the electric dipole.

The method 800 may further comprise changing a rate of penetration of the drill string 200 in response to determining the characteristic.

The method 800 may also further comprise steering the drill string 200 in response to determining the characteristic.

In addition, the above disclosure provides a method of sensing at least one characteristic of a region of a subterranean earth formation 215, 220. The method may include transmitting, via a transmit antenna 105 positioned on a drill string 200, an electromagnetic signal into the region; receiving, via a receive antenna 110 positioned on the drill string 200, the electromagnetic signal from the region; and reducing a homogeneous part of the electromagnetic signal, thereby increasing a depth of detection of the characteristic.

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the above description of the representative embodiments of the disclosure, directional terms, such as "above," "below," "upper," "lower," etc., are used for convenience in referring to the accompanying drawings. In general, "above," "upper," "upward" and similar terms refer to a direction toward the earth's surface along a wellbore, and "below," "lower," "downward" and similar terms refer to a direction away from the earth's surface along the wellbore.

The terms "couple" or "couples," as used herein are intended to mean either an indirect or direct connection. Thus, if a first device couples to a second device, that connection may be through a direct connection, or through an indirect electrical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A downhole sensing system for use while drilling a wellbore with a drill string, the system comprising:
   a transmit antenna positioned on the drill string, the transmit antenna transmitting an electromagnetic signal into a region of an earth formation;
   a receive antenna positioned on the drill string, the receive antenna receiving the electromagnetic signal from the region of the earth formation, whereby at least one characteristic of the region of the earth formation is determined, based at least partially on a first signal as received by the receive antenna at a first time, a second signal as received by the receive antenna at a second time, and a distance traveled by the drill string between the first and the second times.

2. The downhole sensing system of claim 1, wherein the region of the earth formation is located along an intended trajectory of the drill string, ahead of a drill bit.

3. The downhole sensing system of claim 1, wherein the region of the earth formation is located radially outward from the drill string.

4. The downhole sensing system of claim 1, wherein the characteristic comprises at least one of a formation resistivity, a location of a formation anomaly, a geometry of the formation anomaly, a resistivity of the formation anomaly, a location of a formation boundary, a dipping orientation of the formation boundary, a dipping angle of the formation boundary, and a resistivity of a bed adjacent to the formation boundary.

5. The downhole sensing system of claim 1, wherein the transmit antenna comprises one of a magnetic dipole and an electric dipole, and the receive antenna comprises the other of the magnetic dipole and the electric dipole.

6. The downhole sensing system of claim 5, wherein the magnetic dipole comprises at least one of a coil antenna, a solenoid antenna, and a magnetometer.

7. The downhole sensing system of claim 5, wherein the electric dipole comprises at least one of a wire antenna, a toroidal antenna, a button electrode, and a ring electrode.

8. The downhole sensing system of claim 1, wherein a positioning of the transmit antenna relative to the receive antenna provides co-polarization effects between the transmit antenna and the receive antenna.

9. The downhole sensing system of claim 1, wherein a positioning of the transmit antenna relative to the receive antenna provides cross-polarization effects between the transmit and receive antennas.

10. The downhole sensing system of claim 1, wherein a positioning of the transmit antenna relative to the receive antenna provides a combination of co-polarization and cross-polarization effects between the transmit and receive antennas.

11. A method of drilling a wellbore with a drill string, the method comprising:
    transmitting, via a transmit antenna positioned on the drill string, an electromagnetic signal into a region of an earth formation;
    receiving, via a receive antenna positioned on the drill string, the electromagnetic signal from the region of the earth formation; and
    determining at least one characteristic of the region of the earth formation, based at least partially on a first signal as received by the receive antenna at a first time, a second signal as received by the receive antenna at a second time, and a distance traveled by the drill string between the first and the second times.

12. The method of claim 11, wherein the region of the earth formation is located along a trajectory of the drill string, ahead of a drill bit.

13. The method of claim 11, wherein the region of the earth formation is located radially outward from the drill string.

14. The method of claim 11, wherein the characteristic comprises at least one of a formation resistivity, a location of a formation anomaly, a geometry of the formation anomaly, a resistivity of the formation anomaly, a location of a formation boundary, a dipping orientation of the formation boundary, a dipping angle of the formation boundary, and a resistivity of a bed adjacent to the formation boundary.

15. The method of claim 11, wherein the transmit antenna comprises one of a magnetic dipole and an electric dipole, and the receive antenna comprises the other of the magnetic dipole and the electric dipole.

16. The method of claim 15, wherein the magnetic dipole comprises at least one of a coil antenna, a solenoid antenna, and a magnetometer.

17. The method of claim 15, wherein the electric dipole comprises at least one of a wire antenna, a toroidal antenna, a button electrode, and a ring electrode.

18. The method of claim 11, further comprising changing a rate of penetration of the drill string in response to determining the characteristic.

19. The method of claim 11, further comprising steering the drill string in response to determining the characteristic.

20. The method of claim 11, wherein a positioning of the transmit antenna relative to the receive antenna provides co-polarization effects between the transmit and receive antennas.

21. The method of claim 11, wherein a positioning of the transmit antenna relative to the receive antenna provides cross-polarization effects between the transmit and receive antennas.

22. The method of claim 11, wherein a positioning of the transmit antenna relative to the receive antenna provides a combination of co-polarization and cross-polarization effects between the transmit and receive antennas.

\* \* \* \* \*